United States Patent [19]
Shimazawa et al.

[11] Patent Number: 5,915,074
[45] Date of Patent: Jun. 22, 1999

[54] IMAGE FORMATION APPARATUS AND IMAGE FORMATION METHOD

[75] Inventors: Yoichi Shimazawa; Hideo Matsuda, both of Nara; Yasutaka Maeda, Soraku-gun; Shunju Anzai, Nara; Osamu Fujimoto, Yamatokoriyama; Hidekazu Sakagami, Sakurai; Kazumi Irie, Yamatokoriyama, all of Japan

[73] Assignee: Sharp Kabushiki Kaisha, Osaka, Japan

[21] Appl. No.: 08/856,321

[22] Filed: May 14, 1997

[30] Foreign Application Priority Data

May 15, 1996 [JP] Japan .................................. 8-120612
Mar. 11, 1997 [JP] Japan .................................... 9-56696

[51] Int. Cl.⁶ .................................................. G06K 15/00
[52] U.S. Cl. ........................................... 395/104; 395/109
[58] Field of Search .................................... 395/109, 104, 395/101; 399/223, 226, 272, 178, 179; 347/115, 117, 118, 119, 232

[56] References Cited

U.S. PATENT DOCUMENTS

| | | | |
|---|---|---|---|
| 5,557,377 | 9/1996 | Loewen et al. | 399/182 |
| 5,576,824 | 11/1996 | Folkins | 399/228 |

FOREIGN PATENT DOCUMENTS

| | | |
|---|---|---|
| 58-95361 | 6/1983 | Japan . |
| 59-123861 | 7/1984 | Japan . |
| 60-59373 | 4/1985 | Japan . |
| 60-169862 | 9/1985 | Japan . |
| 63-21670 | 1/1988 | Japan . |
| 6143701 | 5/1994 | Japan . |

*Primary Examiner*—Arthur G. Evans

[57] ABSTRACT

Developing devices are provided adjacent to a light sensitive element. An intermediate transfer drum is provided adjacent to the light sensitive elements. After exposure of the light sensitive element, a first color or third color image is formed on the light sensitive element. On the other hand, after exposure of the light sensitive element, a second color or fourth color image can be formed on the light sensitive element. The first color image is transferred from the transfer unit to the intermediate transfer drum at the first transfer portion, and the second color image is transferred from the transfer unit at the second transfer portion so as to be superimposed on the first color image. Similarly, the third color image is transferred so as to be superimposed on the second image and the fourth color image is transferred so as to be superimposed on the third color image to the intermediate transfer drum. Accordingly, the first to fourth color images are superimposed. Thereby, downsizing of the device and cost reduction are achieved and image formation speed is facilitated.

20 Claims, 6 Drawing Sheets

IMAGE FORMATION APPARATUS AND IMAGE FORMATION METHOD

BACKGROUND OF THE INVENTION

1. Field of the Invention

The invention relates to a multicolor or full color image formation apparatus, such as a printer, a copying machine, and a facsimile, and an image formation method.

2. Description of the Prior Arts

A conventional four drum type configuration, which comprises four light sensitive elements provided with one each developing device, used in a full color image formation apparatus utilizing an electrophotography method is disclosed in Japanese Unexamined Patent Publication JP-A 58-95361(1983).

The image formation apparatus disclosed in the official gazette comprises a first process portion for forming an image with a first color 101, a second process portion for forming an image with a second color 102, a third process portion for forming an image with a third color 103, and a fourth process portion for forming an image with a fourth color 104 as illustrated in FIG. 9.

The first process portion 101 comprises a light sensitive element 105, a charger 106 for charging the light sensitive element 105, and a developing device 107 for developing on the basis of an electrostatic latent image formed on the light sensitive element 105. Accordingly, when a laser beam 108 modulated by an image signal is irradiated to a rotating polygon (rotating polygon mirror), which is not illustrated, the laser beam 108 reflected by the polygon is irradiated to the light sensitive element 105 via a reflection mirror, which is not illustrated.

At the time, the light sensitive element 105 is exposed and scanned by the laser beam 108 with respect to the axis direction of the light sensitive element 105. As a consequence, an electrostatic latent image is formed on the light sensitive element 105, and is developed with a developing device 107 on the basis of the electrostatic latent image. Then the image developed by the developing device 107 is transferred on a paper (not illustrated) conveyed by a paper conveyor belt 110 with a transfer unit 109. The light sensitive element 105 after transfer is cleaned by a cleaning blade 111, and the charge thereof is eliminated with a charge eliminator (not illustrated) as needed. Then the light sensitive element 105 is again charged by a charger 106. Since the configuration and operation of the second process portion 102, the third process portion 103, and the fourth process portion are the same as those of the first process portion 101, explanation thereof is not provided herein.

Accordingly, in the image formation apparatus, color images formed by the first to fourth process portions 101, 102, 103 and 104 are transferred successively on a paper to conduct a multicolor copy. In the image formation apparatus, two laser beams are irradiated to a polygon so as to expose and scan two light sensitive elements to the opposite directions by the rotation of the polygon. Accordingly, four light sensitive elements can be exposed with two polygons, and in the official gazette, the device is downsized by providing a minimum number of polygons.

Furthermore, as a full color image formation apparatus, one comprising four developing devices arranged in the vicinity of one light sensitive element is known (not illustrated). As these kind of devices, one utilizing a light sensitive element exposing device and one utilizing two light sensitive element exposing devices are included.

In an image formation apparatus utilizing a light sensitive element exposing device, a full color image is obtained by transferring an image in one color developed with one developing device to a transfer paper or a transfer medium by rotating a light sensitive element, and conducting the same process for the other colors. Accordingly, since a full color image is obtained by rotating the light sensitive element for four times in the device, it is called a four rotation process type image formation apparatus.

An image formation apparatus, which comprises two light sensitive element exposing devices, provided with four each developing devices is disclosed in Japanese Unexamined Patent Publication JP-A 6-143701(1994). Since the device comprises two light sensitive element exposing devices, a two color image can be formed at the same time with respect to one light sensitive element, and thus a full color image can be obtained by rotating the light sensitive element twice.

Furthermore, examples of two color electrophotography copying devices are disclosed in Japanese Unexamined Patent Publications JP-A 59-123861(1984) and JP-A 60-59373(1985).

In a device disclosed in the former official gazette, a first color image and a second color image are formed on two light sensitive elements, respectively. A copying paper is conveyed by a copying paper conveyor belt provided so as to contact with the two light sensitive elements. The images are transferred on the conveyed copying paper. The device is designed so that the diameter of one light sensitive element is smaller than the diameter of the other light sensitive element for downsizing and cost reduction of the device.

In a device disclosed in the latter official gazette, as in the above reference, two light sensitive elements having different diameter sizes are provided. A first developing device for developing a first color is provided adjacent to one light sensitive element, and a second developing device for developing a second color and a third developing device for developing a third color are provided adjacent to the other light sensitive element. In this device, while the second color developing device is in operation, the third developing device does not function, and while the third color developing device is in operation, the second developing device does not function.

According to the configuration, by the use of two light sensitive elements having different diameter sizes, downsizing and cost reduction of the device is achieved as in the above reference. Moreover, since a second color and a third color can be optionally changed, color image of various modes can be provided.

However, in the configuration of the four drum type image formation apparatus disclosed in Japanese Unexamined Patent Publication JP-A 58-95361(1983), since four light sensitive elements are provided each with a charger, a developing device and a transfer unit, the number of parts is large. Thus, the device is enlarged so that a problem of cost increase of the device is generated.

Further, in the configuration of a four rotation process type image formation apparatus using one light sensitive element exposing device or the configuration of an image formation apparatus in Japanese Unexamined Patent publication JP-A 6-143701(1994), since four developing devices are arranged in the vicinity of one light sensitive element, a large light sensitive element is necessary. As a consequence, a problem occurs in that the device itself needs to be large.

In particular, in the former of the image formation apparatuses, since one image is formed by one rotation of a light sensitive element, in order to obtain a full color image, the light sensitive element needs to be rotated four times for forming four images successively one by one. Accordingly, there is a problem in that a long time is required for obtaining a full color image.

In the configurations disclosed in Japanese Unexamined Patent Publications JP-A 59-123861(1984) and JP-A 60-59373(1985), although downsizing and cost reduction of the devices are achieved, the apparatus disclosed in the both official gazettes are a two color electrophotographic copying device. Thus, downsizing or cost reduction of a full color image formation apparatus is not achieved.

Image formation apparatus where a full color image is formed by scanning an original with two optical systems are disclosed in Japanese Unexamined Patent Publication JP-A 60-169862(1985) and Japanese Examined Patent Publication JP-B2 8-33685(1996). Since image formation apparatus shown in the gazettes comprise two optical systems for scanning an original, the configuration of the device is complicated and a problem is generated in that the device itself needs to be large. Besides, in the configuration of an image formation apparatus disclosed in the latter of the official gazettes, since three developing devices are provided in the vicinity of one light sensitive element in two sets, the image formation portion becomes large and a problem is generated in that the device needs to be large.

SUMMARY OF THE INVENTION

Hence the aforementioned present invention was made for solving the problems, and an object thereof is to provide a compact full color image formation apparatus at a low cost as well as an image formation apparatus with an image formation speed faster than conventional ones, and an image formation method in the image formation apparatus.

In order to solve the problems, the invention provides an image formation apparatus for forming a multicolor image, comprising:

first and second light sensitive elements, first and second image exposure means for reading out an original image by exposure and exposing the original image on the first and second light sensitive elements, respectively, first image formation means for successively forming a first color image and a third color image on the first light sensitive element on the basis of the exposure of the first image exposure means, second image formation means for successively forming a second color image and a fourth color image on the second light sensitive element on the basis of the exposure of the second image exposure means, a transfer medium for transferring the first to fourth color images, arranged adjacent to the first and second light sensitive elements, first transfer means for transferring the image formed on the first light sensitive element, on the transfer medium, second transfer means for transferring the image formed on the second light sensitive element, on the transfer medium, and control means for superimposing the first to fourth color images successively formed on the first and second light sensitive elements, on each other, to transfer the first to fourth images to the transfer medium.

According to the configuration, a first color image and a third color image are formed on the first light sensitive element by the first image formation means according to the exposure of the first image exposure means, and on the other hand, a second color image and a fourth color image are formed on the second light sensitive element by the second image formation means according to the exposure of the second image exposure means.

The following methods are considered as a method for transferring the first to fourth images to the transfer medium with the images superimposed to each other:

(a) a first method comprising the steps of forming a first color image on the first light sensitive element, forming a second color image on the second light sensitive element, transferring the first color image on the first light sensitive element and the second color image on the second light sensitive element to the transfer medium with the images superimposed to each other, forming a third color image on the first light sensitive element, forming a fourth color image on the second light sensitive element, and transferring the third color image on the first light sensitive element and the fourth color image on the second light sensitive element to the transfer medium so as to be superimposed onto the first and second color images, and (b) a second method comprising the steps of forming a first color image and a second color image on the first light sensitive element with the images superimposed to each other, forming a second color image and a fourth color image on the second light sensitive element with the images superimposed to each other, and transferring the first and third color images on the first light sensitive element and the second and fourth color images on the second light sensitive element with the images superimposed to each other. Either of the above methods may be used in the present invention.

Therefore, unlike the conventional four drum type image formation apparatus, a full color image can be obtained by forming two color images with two light sensitive elements (first and second light sensitive elements) without using four light sensitive elements. Accordingly, an effect of downsizing the device by the reduction of the number of the light sensitive elements can be achieved. Besides, since a full color image can be obtained by two rotations of each light sensitive element, an effect of providing an image formation apparatus with an image formation speed faster than a conventional four rotation process type image formation apparatus can be realized.

According to the configuration, by the reduction of the number of the light sensitive elements, the number of process elements provided adjacent to the light sensitive elements, such as chargers and cleaning blades can be reduced as well. As a consequence, the cost of the device can be reduced and thus an effect of providing an economical image formation apparatus can also be achieved.

In order to solve the aforementioned problems, the invention provides an image formation apparatus comprising:

an image reading device for reading out an original image, first and second light sensitive elements;

first and third developing devices for developing first and third colors, respectively, on the first light sensitive element on the basis of image signals corresponding to the first and third colors from the image reading device;

second and fourth developing devices for developing second and fourth colors, respectively, on the second light sensitive element on the basis of image signals corresponding to the second and fourth colors from the image reading device;

a transfer medium having first and second transfer portions on the surface;

first transfer means for transferring the first color image developed by the first developing device at the first transfer portion and transferring the third color image developed by the third developing device on the transfer medium so as to be superimposed on the second color image conveyed to the first transfer portion; and second transfer means for transferring the second and fourth images developed by the second and fourth developing devices on the transfer medium so as to be superimposed on the first color image or the third color image conveyed to the second transfer portion, wherein the image reading device includes memory means for storing image signals corresponding to the third and fourth colors and control means for forming the third and fourth color images on the first and second light sensitive elements, respectively, on the basis of the image signals corresponding to the third and fourth colors stored in the memory means after the transfer of the first and second color images on the transfer medium.

According to the configuration, the first light sensitive element is exposed on the basis of image signals corresponding to the first color and the third color from the image reading device as well as the second light sensitive element is exposed on the basis of image signals corresponding to the second color and the fourth color. Since the image reading device comprises memory means for temporarily storing image signals corresponding to the third color and the fourth color, the first color image is formed first at the first light sensitive element and the second color image is formed first at the second light sensitive element.

After the transfer thereof, the control means controls so as to form the third color image and the fourth color image on the first and second light sensitive element on the basis of image signals corresponding to the third color and the fourth color stored in the memory means. Accordingly, the third color image is formed by the third developing device on the first light sensitive element and the fourth color image is formed on the second light sensitive element. Furthermore, the first to fourth color images are transferred to the transfer medium so as to be superimposed to each other by the first and second transfer means.

Accordingly, exposure and scanning of the original needs to be done only once by providing the memory means for temporarily storing a predetermined image signal. Therefore, according to the configuration, effects of providing an image formation apparatus with a rapid image formation speed as well as obtaining a full color image without generating misregistration can be achieved.

In order to solve the aforementioned problems, the image formation apparatus of the invention is characterized in that, assuming that a distance from a first exposure portion where the first light sensitive element is exposed, to the first transfer portion on the first light sensitive element surface is $L_1$, a distance from the first transfer portion to the second transfer portion on the transfer medium surface is $L_2$, and a distance from a second exposure portion where the second light sensitive element is exposed, to the second transfer portion on the second light sensitive element surface is $L_3$, the distances $L_1$, $L_2$ and $L_3$ satisfy a relationship of $L_1+L_2=L_3$.

According to the configuration since the relationship of $L_1+L_2=L_3$ is satisfied, in the case the first light sensitive element and the second light sensitive element are exposed at the same time, an image formed on the second light sensitive element is superimposed on an image preliminarily formed on the first light sensitive element and transferred to the transfer medium at the second transfer portion.

Accordingly, an effect of simplifying the configuration of the device can be achieved according to the configuration since control means for superimposing images formed respectively on the first and second light sensitive elements at the second transfer portion and memory means for temporarily storing image signals of either one for time adjustment are not required.

In order to solve the aforementioned problems, image reading means includes at least image signal generation means for generating image signals corresponding to the first to fourth colors on the basis of reflected light from the original, first light sensitive element exposure means for exposing the first light sensitive element on the basis of image signals corresponding to the first or third color, second light sensitive element exposure means for exposing the second light sensitive element on the basis of image signals corresponding to the second or fourth color, first memory means for temporarily storing image signals corresponding to the third and fourth colors among the image signals corresponding to the first to fourth colors generated by the image signal generation means, and control means for sending image signals corresponding to the fourth color, to the second light sensitive element exposure means as well as sending image signals corresponding to the third color stored in the first memory means, to the first light sensitive element exposure means, at the time a first color image is formed on the first light sensitive element by the first image formation means and a second color image is formed on the second light sensitive element by the second image formation means.

According to the configuration, the image signals corresponding to the third color and the fourth color are stored in the first memory means among the image signals corresponding to the first to fourth colors generated by the image signal generation means. After formation of the first color image and the second color image respectively on the first light sensitive element and the second light sensitive element by the first image formation means and the second image formation means on the basis of the image signals corresponding to the first color and the second color, according to the control by the control means, the image signals corresponding to the third color and the fourth color stored in the first memory means are sent out respectively to the first light sensitive element exposure means and the second light sensitive element exposure means.

Accordingly, since the first memory means for temporarily storing optional image signals is provided, only one time exposure of the original by the image reading means is needed.

In order to solve the aforementioned problems, the image reading means includes at least image signal generation means for generating image signals corresponding to the first to fourth colors on the basis of reflected light from the original, first light sensitive element exposure means for exposing the first light sensitive element on the basis of the image signals corresponding to the first or third color, second light sensitive element exposure means for exposing the second light sensitive element on the basis of the image signals corresponding to the second or fourth color, and image signal selection means for selectively sending the image signals corresponding to the second color, to the second light sensitive element exposure means as well as selectively sending the image signals corresponding to the first color, to the first light sensitive element exposure means, at the time of a first original exposure, and selectively sending the image signals corresponding to the fourth color, to the second light sensitive element exposure means, as well as selectively sending the image signals corresponding to the third color, to the first light sensitive element exposure means, at the time of a second original exposure.

According to the configuration, the image signals corresponding to the first color are selectively sent to the first light sensitive element exposure means among the image signals corresponding to the first color to the fourth color generated by the image signal generation means and the image signals corresponding to the second color are selectively sent to the second light sensitive element exposure means by the image signal selection means at the time of the first original exposure. On the other hand, the image signals corresponding to the third color are selectively sent to the first light sensitive element exposure means and the image signals corresponding to the fourth color are selectively sent to the second light sensitive element exposure means by the image signal selection means at the time of the second original exposure.

Therefore the image signals sent to the first light sensitive element exposure means and the second light sensitive element exposure means are selected by the image signal selection means according to the number of the original exposure in the image formation by the two time original exposures. Thus the image signals corresponding to the third color and the fourth color necessary for the image formation of the second rotation of the first light sensitive element and the second light sensitive element need not be stored at the time of the first original exposure. Accordingly, in addition to the effects of claims 1 and 2, an effect of simplifying the configuration of the device and reducing the cost of the device can be achieved since memory means for storing the image signals is not necessary.

In order to solve the aforementioned problems, the image reading means comprises at least image signal generation means for generating the image signals corresponding to the first to fourth colors on the basis of reflected light from the original, first light sensitive element exposure means for exposing the first light sensitive element on the basis of the image signals corresponding to the first color or the third color, second light sensitive element exposure means for exposing the second light sensitive element on the basis of the image signals corresponding to the second color or the fourth color, second memory means for temporarily storing the image signals corresponding to the first color and the third color among the image signals corresponding to the first to fourth colors generated by the image signal generation means, and control means for sending the image signals corresponding to the first color or the third color stored in the second memory means to the first light sensitive element exposure means when a time corresponding to the distance difference between $(L_1+L_2)$ and $L_3$ where $L_1$ denotes the distance between a first exposure portion which is an exposure position on the first light sensitive element surface and a first transfer portion which is a contact portion of the first light sensitive element and an intermediate transfer medium on the first light sensitive element surface, $L_2$ denotes the distance between the first transfer portion and a second transfer portion which is a contact portion between the second light sensitive element and the intermediate transfer medium on the intermediate transfer medium surface, and $L_3$ denotes the distance between a second exposure portion which is an exposure position on the second light sensitive element surface and the second transfer portion on the second light sensitive element surface.

According to the configuration, the image signals corresponding to the first color and the third color among the image signals corresponding to the first to fourth colors generated by the image signal generation means are temporarily stored in the second memory means.

Here according to the control by the control means, the image signals corresponding to the first color or the third color stored in the second memory means are sent to the first light sensitive element exposure means when a time corresponding to the distance difference between $(L_1+L_2)$ and $L_3$ passes.

Accordingly, in the case the exposure of the first light sensitive element by the first light sensitive element exposure means and the exposure of the second light sensitive element by the second light sensitive element exposure means are synchronized, even if the first exposure portion, the second exposure portion, the first transfer portion and the second transfer portion are not arranged so as to satisfy $(L_1+L_2)=L_3$, at the time of transfer of the second color image formed on the second light sensitive element to the intermediate transfer medium, the second color image is superimposed on the first color image preliminarily transferred from the first light sensitive element to the intermediate transfer medium at the second transfer portion. That is, misregistration of the first color image and the second color image does not occur on the intermediate transfer medium.

Therefore, an effect of improving the quality of an obtained full color image is achieved even if the first exposure portion, the second exposure portion, the first transfer portion and the second transfer portion are not arranged so as to satisfy $(L_1+L_2)=L_3$.

In order to solve the aforementioned problems, the first image formation means includes a first developing device for developing the first color, a third developing device for developing the third color, first charging means for charging the first light sensitive element, and first cleaning means for cleaning the first light sensitive element, and the second image formation means includes a second developing device for developing the second color, a fourth developing device for developing the fourth color, second charging means for charging the second light sensitive element, and second cleaning means for cleaning the second light sensitive element, and the first image formation means and the second image formation means have a common configuration of constituents and a common arrangement.

According to the configuration, since the first developing device, the third developing device, the first charging means and the first cleaning means comprising the first image formation means and the second developing device, the fourth developing device, the second charging means and the second cleaning means comprising the second image formation means have common configuration and arrangement, the productivity of the constituents is improved. Accordingly, a great economical effect can be achieved.

In order to solve the problems, the first to fourth developing units are removable and arranged at positions interchangeable to each other.

According to the configuration, developing units for developing certain colors can be attached optionally. Therefore, for example, in the case of two-color copying, by setting a developing unit for developing a black color to the second image formation means and setting a developing unit for developing a color frequently used to the first image formation means, the two-color image formation can be conducted quickly in one rotation of the first and second light sensitive elements. Thus, according to the configuration, various demands on the image formation conditions from the users can be satisfied easily.

Therefore, an effect of easily satisfying the various demands on the image formation conditions from the users can be achieved since developing units for developing certain colors can be optionally selected.

In order to solve the aforementioned problems, developing methods of at least the third and fourth developing devices are non-contact developing methods for developing without contacting with the first and second light sensitive elements, respectively.

According to the configuration, since a separating and contacting mechanism is not required for the third and fourth developing devices with respect to the first and second light sensitive elements, a configuration of the device main body is simplified to provide a inexpensive device as well as a high quality image formation without color-mixing can be conducted.

Therefore, since a separating and contacting mechanism is not required for the third and fourth developing devices with respect to the first and second light sensitive elements, effects of simplifying a configuration of the device main body to provide a inexpensive device as well as conducting a high quality image formation without color-mixing can be achieved.

In order to solve the aforementioned problems, developing methods of the first to fourth developing devices are non-contact developing methods for developing without contacting with the first and second light sensitive elements.

According to the configuration, since a complicated developing control at the time of not conducting developing (such as separating and contacting operation of the first to fourth developing devices and the shutter control of the developer) is not required, the first to fourth developing devices are arranged freely so that a wide range of usage is enabled for a user easily.

Therefore, since a complicated developing control at the time of not developing is not required, an effect of arranging the first to fourth developing devices freer is achieved so that a wide range of usage is enabled for a user easily.

In order to solve the aforementioned problems, the intermediate transfer medium is a belt-type intermediate transfer belt.

According to the configuration, the transfer area can be wider than the case the intermediate transfer medium comprises a drum. Therefore, an image can be transferred maximally utilizing the transfer area on the transfer material as well as the transfer efficiency can be optimized. Besides, without having an effect from the transfer material, the transfer conditions of each color can be set freely, and thus the control can be simplified. Furthermore, if the intermediate transfer medium is arranged in the light sensitive elements arrangement direction, the height of the device can be lowered and the device can be downsized.

Accordingly, the transfer area can be wider than the case the intermediate transfer medium comprises a drum. Therefore effects of transferring an image maximally utilizing the transfer area on the transfer material as well as optimizing the transfer efficiency can be achieved. Besides, without having an effect from the transfer material, the transfer conditions of each color can be set freely, and thus the control can be simplified. Furthermore, if the intermediate transfer medium is arranged in the light sensitive elements arrangement direction, an effect of lowering the height of the device and downsizing the device can be achieved.

In order to solve the aforementioned problems, the first light sensitive element and the second light sensitive element are composed of first and second light sensitive element belts, respectively.

According to the configuration, by arranging the first and second light sensitive element belts horizontally, the height can be lowered compared with the case the light sensitive elements comprise drums. Accordingly, the height of the device can be lowered to downsize the device.

Accordingly, by arranging the first and second light sensitive element belts horizontally, the height can be lowered compared with the case the light sensitive elements comprise drums. Accordingly, an effect of lowering the height of the device to downsize the device can be achieved.

On the other hand, if the first and second light sensitive element belts are arranged vertically, even though the height of the device is slightly increased, the area occupied by the device is reduced. Accordingly, an effect of providing a device with a little installation area can be achieved.

In order to solve the aforementioned problems, the first and second light sensitive element belts are arranged so that areas contacting with the intermediate transfer medium are increased.

According to the configuration, since the area where the first light sensitive element belt and the intermediate transfer medium is contacted and the area where the second light sensitive element belt and the intermediate transfer medium are increased, the transfer area can be wider. Therefore, the transfer efficiency from the first and second light sensitive element belts to the intermediate transfer medium can be further improved.

Therefore, since the area where the first light sensitive element belt and the intermediate transfer medium is contacted and the area where the second light sensitive element belt and the intermediate transfer medium are increased, the transfer area can be wider. Therefore, an effect of further improving the transfer efficiency from the first and second light sensitive element belts to the intermediate transfer medium can be achieved.

In order to solve the aforementioned problems, the invention provides an image formation apparatus for forming a multicolor image, comprising:

first and second light sensitive elements;

image reading means for reading an original image and exposing the first and second light sensitive elements on the basis of a readout original image;

first image formation means for successively forming first and third color images on the first light sensitive element on the basis of exposure of the image reading means;

second image formation means for successively forming second and fourth color images on the second light sensitive element on the basis of exposure of the image reading means;

a transfer medium for transferring the first to fourth color images directly on a transfer material by direct contact of the first to fourth color images with the transfer material;

adhering means for adhering the transfer material to the transfer medium;

first transfer means for transferring the image formed on the first light sensitive element, to the transfer material;

second transfer means for transferring the image formed on the second light sensitive element, to the transfer material, and control means for transferring the first to fourth color images successively formed on the first and second light sensitive elements to the transfer material so as to be superimposed to each other.

According to the configuration, the first and third color images are formed on the first light sensitive element by the first image formation means as well as the second and fourth color images are formed on the second light sensitive element by the second image formation means on the basis of the exposure of the image reading means.

As methods for transferring the first to fourth images to the transfer medium with the images superimposed to each other, either of the methods (a) and (b) described in the foregoing explanation of the image formation apparatus according to the invention can be used.

Therefore, unlike the conventional four drum type image formation apparatus, a full color image can be obtained by forming two color images with two light sensitive elements (first and second light sensitive elements) without using four light sensitive elements. Accordingly, an effect of downsizing the device by the reduction of the number of the light sensitive elements can be achieved. Besides, since a full color image can be obtained by two rotations of each light sensitive element, an effect of providing an image formation apparatus with an image formation speed faster than a conventional four rotation process type image formation apparatus can be realized.

According to the configuration, by the reduction of the number of the light sensitive elements, the number of process elements provided adjacent to the light sensitive elements, such as chargers and cleaning blades can be reduced as well. As a consequence, the cost of the device can be reduced and thus an effect of providing an economical image formation apparatus can also be achieved.

Furthermore, since images formed on the first light sensitive element and the second light sensitive element are transferred directly on the transfer material, an effect of improving transfer efficiency can be achieved compared with a two time transfer method where the images are transferred to an intermediate transfer medium and transferred from the intermediate transfer medium to a transfer material.

In order to solve the aforementioned problems, the transfer medium is a belt-type transfer belt.

According to the configuration, by arranging the transfer belt horizontally, the height can be lowered compared with the case the transfer medium comprises a drum. Accordingly, the height of the device can be lowered to downsize the device.

Furthermore, by providing a transfer medium comprising a transfer belt, the transfer area can be wider than the case the transfer medium comprises a drum. Therefore, an image can be transferred maximally utilizing the transfer area on the transfer material as well as the transfer efficiency can be optimized.

In order to solve the aforementioned problems, the invention provides an image formation method comprising the steps of:

exposing and scanning an original to form a first color image on a first light sensitive element and form a second color image on a second light sensitive element;

transferring the first color image on a transfer medium and transferring the second color image on the transfer medium so as to be superimposed on the first color image;

exposing and scanning the original again to form a third color image on the first light sensitive element and form a fourth color image on the second light sensitive element; and transferring the third color image on the transfer medium so as to be superimposed on the second color image and transferring the fourth color image on the transfer medium so as to be superimposed on the third color image.

According to the configuration, by exposing and scanning the original, the first color image is formed on the first light sensitive element and the second color image is formed on the second light sensitive element. After the transfer of the first color image on the transfer medium, the second color image is transferred on the transfer medium so as to be superimposed on the first color image.

Then by exposing and scanning the original again, the third color image is formed on the first light sensitive element and the fourth color image is formed on the second light sensitive element. Then the third color image is transferred on the transfer medium so as to be superimposed on the second color image preliminarily transferred on the transfer medium. The fourth color image is transferred on the transfer medium so as to be superimposed on the third color image. Accordingly, the first to fourth color images transferred on the transfer medium are superimposed to each other.

Therefore, an effect of providing an image formation apparatus with an image formation speed faster than a conventional four rotation process type image formation apparatus can be realized.

In order to solve the aforementioned problems, the invention provides an image formation method comprising the steps of:

exposing and scanning an original to store image signals corresponding to a third color and a fourth color;

forming a first color image on a first light sensitive element on the basis of image signals corresponding to the first color and forming a second color image on a second light sensitive element on the basis of image signals corresponding to the second color;

transferring the first color image and the second color image on the transfer medium so that the images are superimposed to each other;

forming a third color image on the first light sensitive element on the basis of the stored image signals corresponding to the third color and forming a fourth color image on the second light sensitive element on the basis of the stored image signals corresponding to the fourth color;

transferring the third color image on the transfer medium so as to be superimposed on the second color image; and transferring the fourth color image on the transfer medium so as to be superimposed on the third color image.

According to the configuration, by exposing and scanning the original, the first color image is formed on the first light sensitive element on the basis of the image signals corresponding to the first color. Similarly, the second color image is formed on the second light sensitive element on the basis of the image signals corresponding to the second color. The second color image is transferred on the transfer medium so as to be superimposed on the first color image.

Then the third color image is formed on the first light sensitive element on the basis of the stored image signals corresponding to the third color. Similarly, the fourth color image is formed on the second light sensitive element on the basis of the stored image signals corresponding to the fourth color. The third color image is transferred on the transfer medium so as to be superimposed to the second color image preliminarily transferred and the fourth color image is transferred on the transfer medium so as to be superimposed on the third color image. That is, the first to fourth color images transferred on the transfer medium are superimposed to each other.

According to the configuration, a full color image formation can be conducted without generating reading misregistration of the original. Besides, since exposing and scanning of the original needs to be done only once, an image formation can be conducted faster compared with the case of a conventional four rotation process type image formation apparatus.

Therefore a full color image formation can be conducted without generating reading misregistration of the original. Besides, since exposing and scanning of the original needs to be done only once, an effect of conducting an image formation faster compared with the case of a conventional four rotation process type image formation apparatus can be achieved.

In order to solve the aforementioned problems, the invention provides an image formation method comprising the steps of:

exposing and scanning an original to form a first color image on a first light sensitive element on the basis of image signals corresponding to the first color as well as to form a second color image on a second light sensitive element on the basis of image signals corresponding to the second color;

transferring the first color image and the second color image on a transfer so that the images are superimposed to each other;

exposing and scanning the original again to form a third color image on the first light sensitive element on the basis of image signals corresponding to the third color as well as to form a fourth color image on the second light sensitive element on the basis of image signals corresponding to the fourth color;

transferring the third color image on the transfer medium so as to be superimposed on the second color image; and transferring the fourth color image on the transfer medium so as to be superimposed on the third color image.

According to the configuration, by exposing and scanning the original, the first color image is formed on the first light sensitive element on the basis of the image signals corresponding to the first color. Similarly, the second color image is formed on the second light sensitive element on the basis of the image signals corresponding to the second color. The second color image is transferred on the transfer medium so as to be superimposed on the first color image.

Then by exposing and scanning the original again, the third color image is formed on the first light sensitive element on the basis of the image signals corresponding to the third color. Similarly, the fourth color image is formed on the second light sensitive element on the basis of the image signals corresponding to the fourth color. The third color image is transferred on the transfer medium so as to be superimposed to the second color image preliminarily transferred and the fourth color image is transferred on the transfer medium so as to be superimposed on the third color image. That is, the first to fourth color images transferred on the transfer medium are superimposed to each other.

Accordingly, since the original is exposed and scanned whenever an image is formed on the first and second light sensitive elements, a process of storing certain image signals among image signals corresponding to first to fourth colors is not necessary. Therefore, memory means for storing certain image signals is not required. Thus according to the configuration, effects of conducting image formation faster than a conventional four rotation process type image formation apparatus as well as reducing a cost of the device for not needing expensive memory means can be achieved.

BRIEF DESCRIPTION OF DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
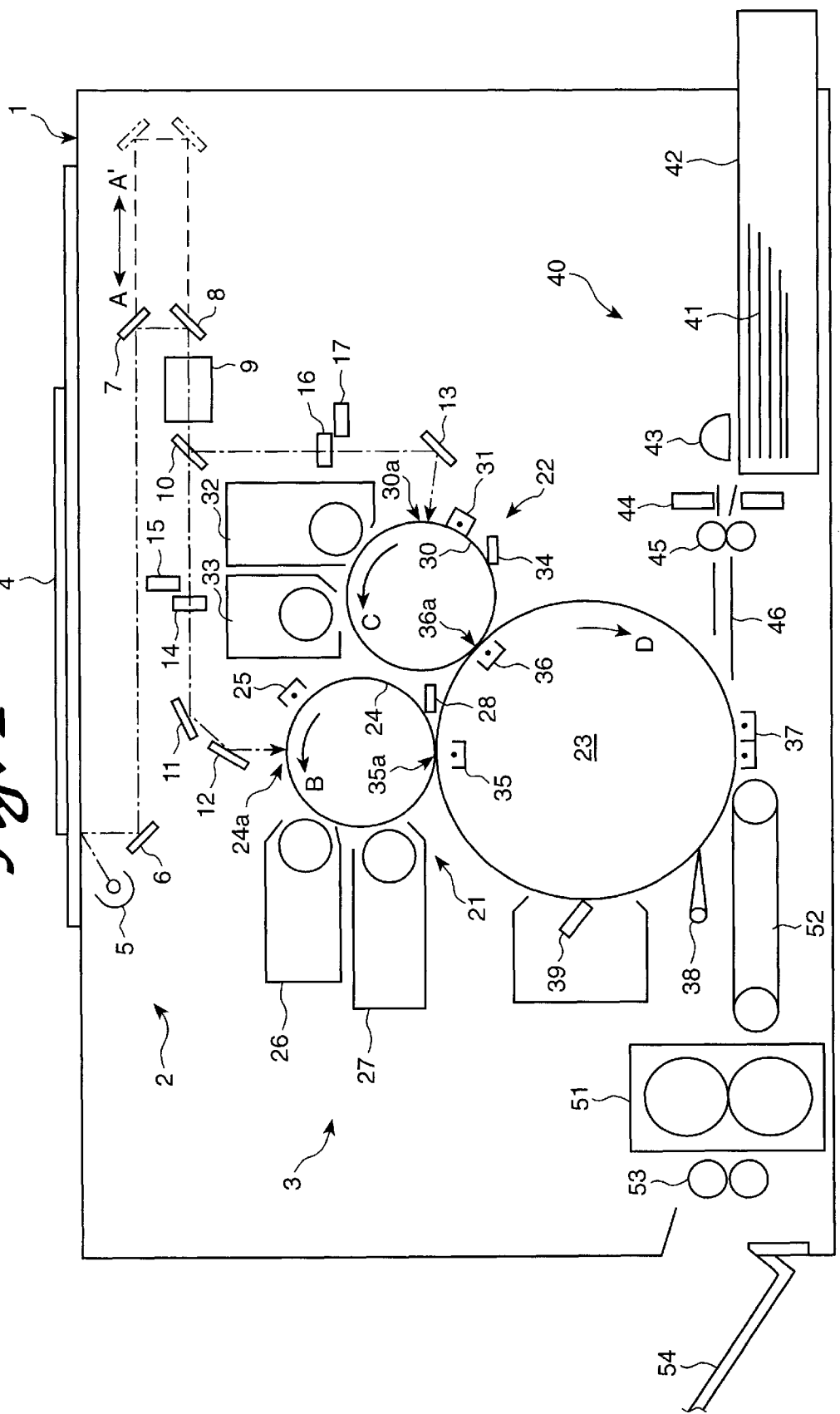
FIG. 1 is a schematic cross-sectional diagram of an image formation apparatus of Example 1 of the present invention.

Now referring to the drawings, preferred embodiments of the invention are described below.

Example 1 of the present invention will be explained with reference to FIG. 1.

As shown in FIG. 1, an image formation apparatus 1 according to Example 1 comprises an image reading portion 2 for reading the original image and an image formation portion 3 for forming an image on the basis of the original image read out by the image reading portion 2.

In the image reading portion 2, a light source 5 is arranged at a position capable of exposing an original 4 placed on a predetermined position of the image formation apparatus 1. Reflection mirrors 6, 7, 8 are arranged so as to guide a reflected light from the original 4 to a zoom lens 9. The light source 5 and the reflection mirrors 6, 7, 8 can move horizontally in the direction shown by an arrow A-A' in FIG. 1. Accordingly, the original 4 is exposed and scanned in the arrow A-A' direction.

A half mirror 10 is arranged at the side where light flux of the zoom lens 9 is outputted. Accordingly, a light flux passed through the zoom lens 9 is split to a light flux to pass through the half mirror 10 and a light flux to be reflected by the half mirror 10. The light flux passed through the half mirror 10 is irradiated to a light sensitive element 24 later described of an image formation portion 3 via half mirrors 11, 12. On the other hand, the light flux reflected by the half mirror 10 is irradiated to a light sensitive element 30 later described of the image formation portion 3 via a reflection mirror 13.

Either one of a filter 14 (such as blue color) and a filter 15 (such as red color) is optionally selected according to a color to be developed and inserted between the half mirror 10 and the reflection mirror 11. On the other hand, either one of a filter 16 (such as green color) and a filter 17 (such as infrared color) is optionally selected and inserted between the half mirror 10 and the reflection mirror 13.

Accordingly, in the case that a blue color light passed through the filter 14 is irradiated to the light sensitive element 24, yellow developing is conducted by a developing device 26 later described. In the case a red color light passed through the filter 15 is irradiated to the light sensitive element 24, cyan developing is conducted by a developing device 27 later described.

Further in the case that a green color passed through the filter 16 is irradiated to the light sensitive element 30, magenta developing is conducted by a developing device 32 later described. In the case that an infrared light passed through the filter 17 is irradiated to the light sensitive element 30, black developing is conducted by a developing device 33 later described.

The configuration of the image formation portion 3 will be explained below. As shown in the drawing, the image formation portion 3 comprises a first process portion 21 (first image formation means), a second process portion 22 (second image formation means), and an intermediate transfer drum 23 as a transfer medium (intermediate transfer medium). The first process portion 21 comprises a light sensitive element 24 rotatable in the direction shown by an arrow B (first light sensitive element), a charger 25 for charging the light sensitive element 24 (first charging means), a developing device 26 for developing a first color (such as yellow) on the basis of an electrostatic latent image formed on the light sensitive element 24 (first developing device), a developing device 27 similarly for developing a third color (such as cyan) (third developing device) and a cleaning blade 28 (first cleaning means).

The light sensitive element 24 is arranged adjacent to the surface of the intermediate transfer drum 23. The charger 25, the developing devices 26, 27, and the cleaning blade 28 are arranged adjacent to the surface of the light sensitive element 24 in this order in the rotation direction of the light sensitive element 24.

The second process portion 22 comprises a light sensitive element 30 rotatable in the direction shown by an arrow C (second light sensitive element), a charger 31 for charging the light sensitive element 30, a developing device 32 for developing a second color (such as magenta) on the basis of an electrostatic latent image formed on the light sensitive element 30, a developing device 33 for similarly developing a fourth color (such as black) (fourth developing device), and a cleaning blade 34.

The light sensitive element 30 is arranged adjacent to the surface of the intermediate transfer drum 23. The charger 31, the developing devices 32, 33, and the cleaning blade 34 are arranged adjacent to the surface of the light sensitive element 30 in this order in the rotation direction of the light sensitive element 30.

According to the configuration, the light sensitive element 24 is uniformly charged by the charger 25. At the time the light sensitive element 24 is exposed with a light flux passed through the filter 14, that is, a first color light image, an electrostatic latent image is formed on the light sensitive element 24. The developing device 26 develops the electrostatic latent image. As a consequence, the first color image is formed on the light sensitive element 24 as a visible image. The first color image is transferred on the intermediate transfer drum 23 by a transfer unit 35 later described.

Then the light sensitive element 24 after the transfer is cleaned by the cleaning blade 28 and the charge is eliminated by a charge eliminating device (not illustrated) as needed. Then the light sensitive element 24 is uniformly charged by the charger 25 again.

The light sensitive element 30 is uniformly charged by the charger 31. At the time the light sensitive element 30 is exposed with a light flux passed through the filter 16, that is, a second color light image, an electrostatic latent image is formed on the light sensitive element 30. The developing device 32 develops the electrostatic latent image. As a consequence, the second color image is formed on the light sensitive element 30 as a visible image. The second color image is transferred on the intermediate transfer drum 23 by a transfer unit 36 later described. Then the light sensitive element 30 after the transfer is cleaned by the cleaning blade 34 and the charge is eliminated by a charge eliminating device (not illustrated) as needed. Then the light sensitive element 30 is uniformly charged by the charger 31 again.

Since the processes of charging, developing, transferring, cleaning, charge eliminating are conducted for each color image formation at the light sensitive elements 24, 30, toner mixing would not occur at the light sensitive elements 24, 30.

For the image formation of a third color and a fourth color, the filter 14 is replaced by the filter 15 and the filter 16 is replaced by the filter 17. A second exposure is conducted with respect to the original 4, and the image formation is conducted similar to the first color and the second color.

Transfer units 35, 36 (first transfer means, second transfer means) are arranged at positions facing the light sensitive elements 24, 30 in the intermediate transfer drum 23. Images on the light sensitive elements 24, 30 are transferred to the intermediate transfer drum 23 by the transfer unit 35, 36. The intermediate transfer drum 23 is rotatable in the direction shown by an arrow D. A transfer unit 37 is arranged adjacent to the intermediate transfer drum 23 so that an image transferred on the intermediate transfer drum 23 is transferred on a paper 41 later described by the transfer unit 37.

A paper removing nail 38 for removing the paper 41 adhered to the intermediate drum 23 and a cleaning blade 39 for cleaning the intermediate transfer drum 23 after the transfer are arranged at the downstream side with respect to the rotation direction of the intermediate transfer drum 23 of the transfer unit 37 in this order. The paper removing nail 38 is for forcibly removing the paper 41 in the case the paper 41 does not detach from the intermediate transfer drum 23 so as not to disturb an image formed on the intermediate transfer drum 23.

The image formation apparatus 1 main body comprises a control device (not illustrated) for controlling cleaning operation of the intermediate transfer drum 23 by the cleaning blade 39. Accordingly, the intermediate transfer drum 23 is not cleaned until four images formed on the intermediate transfer drum 23 are transferred on the paper 41 in a full color image formation. In the case that a first color image and a second color image are formed in the first rotation of the intermediate transfer drum 23 in a two color image formation, the intermediate transfer drum 23 is cleaned by the cleaning blade 39 after the transfer of the images to the paper 41.

A paper supply portion 40 is provided at the paper supply side of a paper with respect to the image formation portion 3. The paper supply portion comprises a paper cassette 42 accommodating a paper 41 as a recording medium, a paper supply roller 43 for feeding the paper 41 from the paper cassette 42, a paper sensor 44 for controlling so that the edge of an image on the intermediate transfer drum 23 and the edge of the paper 41 are coincided, a resist roller 45, and a paper guide 46 for guiding the paper 41 between the intermediate transfer drum 23 and the transfer unit 37. The paper supply portion 40 comprises a paper supply sensor (not illustrated) for detecting the supply of the paper 41. The paper supply roller 43 is rotated by a driving device (not illustrated).

Accordingly, the paper is picked up by the paper supply roller 43 one by one and sent out by the paper sensor 44 and the resist roller 45 so that the edge of an image on the intermediate transfer drum 23 and the edge of the paper 41 are coincided. The paper is guided by the paper guide 46 so as to be conveyed between the intermediate transfer drum 23 and the transfer unit 37.

A fixing device 51 for fixing an image transferred on the paper 41 by the transfer unit 37, a paper conveyance roller 52 for conveying the paper 41 to the fixing device 51, a paper discharge roller 53 for discharging the paper 41 treated by the fixing device 51 to a paper discharge tray 54, and the paper discharge tray 54 for receiving the discharged paper 41 are provided at the paper discharge side of the paper 41 with respect to the image formation portion 3. The paper discharge roller 53 is rotated by a driving device (not illustrated).

Accordingly, the paper 41 on which an unfixed full color image is transferred by the transfer unit 37 is conveyed to the fixing device 51 by the paper conveyance roller 52. The image is fixed on the paper 41 by the fixing device 51. Then the paper 41 is discharged to the paper discharge tray 54 by the paper discharge roller 53.

Operation of the image formation apparatus 1 in the case of forming a full color image in the configuration will be described hereinafter.

After the exposure of the original 4 by the light source 5, the reflected light enters the half mirror 10 through the reflection mirrors 6, 7, 8 and the zoom lens 9. The reflected light is split to a light flux to pass through the half mirror 10 and a light flux to be reflected by the half mirror 10. The light flux passed through the half mirror 10 exposes the light sensitive element 24 at the first exposure portion 24a via the filter 14 optionally inserted according to the color to be developed, and the reflection mirrors 11, 12. The light flux reflected by the half mirror 10 exposes the light sensitive element 30 at the second exposure portion 30a via the filter 16 optionally inserted according to the color to be developed, and the reflection mirror 13.

The light sensitive element 24 of the first process portion 21 is uniformly charged by the charger 25 in advance. At the time a light flux passed through the half mirror 10 is irradiated to the light sensitive element 24, a first electrostatic latent image is formed on the light sensitive element 24. The developing device 26 develops a first color on the basis of the first electrostatic latent image. The developed first color image is conveyed to the first transfer portion 35a according to the rotation of the light sensitive element 24, and transferred to the intermediate transfer drum 23 by the transfer unit 35. Then the transferred first color image is conveyed to the second transfer portion 36a according to the rotation of the intermediate transfer drum 23.

The light sensitive element 24 after the transfer is cleaned by the cleaning blade 28 and the charge is eliminated by the charge eliminating device (not illustrated) as needed. Then the light sensitive element 24 is uniformly charged by the charger 25 again.

The light sensitive element 30 of the second process portion 22 is uniformly charged by the charger 31 in advance. At the time a light flux reflected by the half mirror 10 is irradiated to the light sensitive element 30, a second electrostatic latent image is formed on the light sensitive element 30. The developing device 32 develops a second color on the basis of the second electrostatic latent image. The developed second color image is conveyed to the second transfer portion 36a according to the rotation of the light sensitive element 30, and transferred to the intermediate transfer drum 23 by the transfer unit 36. The transfer of the second color image to the intermediate transfer drum 23 is conducted so as to be positioned superimposing to the conveyed first color image.

The light sensitive element 30 after the transfer is cleaned by the cleaning blade 34 and the charge is eliminated by the charge eliminating device (not illustrated) as needed. Then the light sensitive element 30 is uniformly charged by the charger 31 again.

As to the image formation of a third color and a fourth color, the same process as the first color and the second color is conducted. However, as mentioned above, after the transfer of the first color image and the second color image to the intermediate transfer drum 23, the filter 14 is replaced by the filter 15 and the filter 16 is replaced by the filter 17. Then the second exposure is conducted by irradiating a light beam to the original 4 from the light source 5.

The light sensitive element 24 of the first process portion 21 is uniformly charged by the charger 25 in advance as mentioned above. At the time a light flux passed through the half mirror 10 is irradiated to the light sensitive element 24 via the filter 15 and the reflection mirrors 11, 12, a third electrostatic latent image is formed on the light sensitive element 24. The developing device 27 develops a third color on the basis of the third electrostatic latent image. The developed third color image is conveyed to the first transfer portion 35a according to the rotation of the light sensitive element 24, and transferred to the intermediate transfer drum 23 by the transfer unit 35. Then the transferred third color image is conveyed to the second transfer portion 36a according to the rotation of the intermediate transfer drum 23.

The light sensitive element 24 after the transfer is cleaned by the cleaning blade 28 and the charge is eliminated by the charge eliminating device (not illustrated) as needed. Then the light sensitive element 24 is uniformly charged by the charger 25 again.

The light sensitive element 30 of the second process portion 22 is uniformly charged by the charger 31 in advance. At the time a light flux reflected by the half mirror 10 is irradiated to the light sensitive element 30 via the filter 17 and the reflection mirror 13, a fourth electrostatic latent image is formed on the light sensitive element 30. The developing device 33 develops a fourth color on the basis of the fourth electrostatic latent image. The developed fourth color image is conveyed to the second transfer portion 36a according to the rotation of the light sensitive element 30, and transferred to the intermediate transfer drum 23 by the transfer unit 36. The transfer of the fourth color image to the intermediate transfer drum 23 is conducted so as to be positioned superimposing to the first, second, third color images transferred on the intermediate transfer drum 23.

The light sensitive element 30 after the transfer is cleaned by the cleaning blade 34 and the charge is eliminated by the charge eliminating device (not illustrated) as needed. Then the light sensitive element 30 is uniformly charged by the charger 31 again.

The four kinds of images transferred superimposing on the intermediate transfer drum 23, that is, an unfixed full color image is conveyed to the vicinity of the transfer unit 37 according to the rotation of the intermediate transfer drum 23. Then the edge of a paper supplied from a paper supply portion 40 later described and the edge of the image are positioned to meet, and the image is transferred to the paper 41 by the transfer unit 37.

The paper 41 on which the image is transferred is conveyed to the fixing device 51 by the paper conveyance roller 52. The image is fixed on the paper 41 by the fixing device 51. Then the paper 41 is discharged to the paper discharge tray 54 by the paper discharge roller 53.

According to the configuration, one each color image is formed by one rotation of the light sensitive elements 24, 30, namely, by two rotations of the light sensitive elements 24, 30, total four color images are formed. That is, a full color image can be obtained by the use of two light sensitive elements 24, 30 without requiring four light sensitive elements. According to the configuration, the device can be downsized by the reduction of the number of the light sensitive elements. Besides, since a full color image can be obtained by two rotations of the light sensitive elements 24, 30, an image formation apparatus with an image formation speed faster than a conventional four rotation process type image formation apparatus can be provided.

According to the configuration, by the reduction of the number of the light sensitive elements, the number of process elements provided adjacent to the light sensitive elements, such as chargers and cleaning blades can be reduced as well. As a consequence, the cost of the device can be reduced and thus an economical image formation apparatus can be provided. Besides, since the light sensitive elements 24, 30 are cleaned by the cleaning blade each time of the image transfer to the intermediate transfer drum 23, a full color image formation apparatus without color-mixing can be obtained.

The four developing devices 26, 27, 32, 33 are for development on the basis of an electrostatic latent image formed on the light sensitive elements 24, 30 as needed. Therefore, there is no possibility that another developing device implements development during one developing device is developing. As controlling methods thereof, the methods mentioned below are commonly known.

①A method of providing a mechanism for cutting off the operation of the developer blush of the main pole side of a two component magnetic blush developing device.

② A method of providing a mechanism for separating and contacting the developing device with a light sensitive element.

③A method of preventing a developer being attached to a light sensitive element at the time of not conducting developing by providing bias voltage application means for applying bias voltage in the developing device.

④A method of using a developing device for developing without contacting to a light sensitive element, where a developer is attached to the light sensitive element by applying bias voltage at the time of developing, on the other hand, the developer is not attached to the light sensitive element by not applying bias voltage at the time of not implementing development.

Since these control methods are known, a detailed explanation is not provided herein. These methods can be optionally used according to the application, or can be used in combination of two or more.

In the case of forming a one color image using the image formation apparatus 1 of Example 1, the operation is as follows. The one color image formation can be conducted using a necessary color filter. That is, by selecting and inserting the filter of the same color as a light flux passing through or reflected by the half mirror 10, the one color image is formed on the light sensitive element 24 or the light sensitive element 30.

In the case that a color filter is not used, all the light fluxes are irradiated to the light sensitive element of the process portion including the designated developing device, and using the developing device of the designated developing color, an image is formed by one rotation process f the light sensitive element.

Since the image formation at the first process portion 21, or the second process portion 22, and the operation after the image formation are the same as the case of a full color image formation, a detailed explanation is not provided herein.

The operation of the case of two color image formation is as follows. In this case, three color combinations are available as shown in Table 1 according to the positions of the developing devices 26, 27, 32, 33 of the first and second process portions 21, 22.

TABLE 1

| Mode | The developing device used in the first rotation of the intermediate transfer drum 23 | | The developing device used in the second rotation of the intermediate transfer drum 23 | |
| --- | --- | --- | --- | --- |
| | The first process portion 21 | The second process portion 22 | The first process portion 21 | The second process portion 22 |
| ① | 26 or 27 | 32 or 33 | Not used | Not used |
| ② | 26 or 27 | Not used | 27 or 26 | Not used |
| ③ | Not used | 32 or 33 | Not used | 33 or 32 |

Only the numbers of the members in the developing device to be used are shown in Table 1. According to the Table, for example, the mode ① denotes a two color image is formed by one rotation of the intermediate transfer drum 23. The modes ② and ③ denote either one of the first process portion 21 and the second process portion 22 is used for an image formation.

In Example 1, the constituents of the first process portion 21 and the second process portion 22 including the developing devices 26, 27, 32, 33 are removable and common to each other. Information acknowledgment means for acknowledging the information such as the color information of the developer, the color combinations, the process conditions, the toner amount, the image formation number, and the like, is provided in the image formation apparatus 1 main body. Accordingly, various image formation conditions of a user can be satisfied.

For example, the most frequent combination in two color copying is black and a color. Therefore a developing device for developing a color most frequently used by a user is mounted in the first process portion 21, and a developing device for developing black is mounted in the second process portion 22. Accordingly, the two color copying frequently used can be done by one rotation of the transfer medium 23. According to the configuration, an image formation apparatus 1 having a copying speed faster than conventional devices in two color copying can be provided.

In the case of a full color image using three or more colors, the image is copied by two rotations of the transfer medium 23. By having common constituents for the first process portion 21 and the second process portion 22, since a developing device for developing a certain color can be optionally selected, various requirements by a user can be met, and an image formation apparatus 1 with a good operability and a high practicality can be provided. Accordingly, since productivity of the developing devices 26, 27, 32, 33 is improved, by providing an image formation apparatus 1 of Example 1, a large economical effect can be achieved.

Although two filters of different colors are provided to one optical path and one of them is inserted in Example 1, the number of the filters is not limited thereto. For example, a configuration where filters of two or more different colors are provided for one optical path and is controlled so that one of them is optionally selected and inserted can be adopted as well.

That is, for example, by providing four filters for one optical path, at the time an optional developing device is located at an optional position, a filter corresponding to the mounted developing device can be optionally selected on the basis of the acknowledgment result of the information acknowledgment means so as to be inserted to the optical path. As a consequence, regardless of the mounting position of the developing device, a full color image can be obtained. Besides, in the case of image formation of specific two colors, since it can respond to various color combinations immediately, a high speed two color copying is available by the one rotation process of the light sensitive elements 24, 30.

That is, in Example 1, the filters 14, 15, 16, 17 are arranged so as to correspond to the developing devices 26, 27, 32, 33 mounted in the first process portion 21, the second process portion 22. However, for example, even in the case the developing device 32 originally mounted in the second process portion 22 is mounted to the first process portion 21, by having the four filters 14, 15, 16, 17 interchangeably, it can be dealt with immediately so as to conduct developing. The interchange of the filters 14, 15, 16, 17 can be conducted manually.

According to the configuration, since the developing devices 26, 27, 32, 33 are removable and common, and thus an optional developing device can be mounted at an optional position, for example, a developing device having a specific color (yellow, magenta, cyan, or other colors) can be mounted at plural positions according to the application of a user. Accordingly, by mounting a developer frequently used such as black and red in plural developing devices, the number of changing developing devices can be reduced in the case of conducting two color copying in a large amount.

In the case of the one color copy mode and the two color copy mode, an image is formed on one light sensitive element using color filters, on the other hand, the following process control is conducted so as not to form an image on the other light sensitive element. That is, control of not irradiating an unnecessary light flux to the light sensitive element, not charging the light sensitive element, or eliminating the charge of the light sensitive element by a charge not illustrated so as not to develop is conducted.

Although the intermediate transfer drum 23 is used as the transfer medium in Example 1, a transfer drum for adhering the paper 41, a transfer belt, or means moving back and forth can be used in place of the intermediate transfer drum 23. The case of using the transfer drum or the transfer belt will be explained later in Examples.

The means moving back and forth denotes means for reverse rotating the transfer medium each time of one color transfer and returning to a predetermined distance (to the printing standard position), and reverse rotating the transfer medium again. Accordingly, in the case a transfer drum or a transfer belt is used as the transfer medium, the transfer conditions (driving mechanism and the accuracy thereof) of four colors can be the same, and thus the accuracy of superimposing the four colors can be improved.

Example 2 of the present invention will be explained with reference to FIGS. 2 and 3. The members having the same function as in Example 1 have the same numerals and further explanation will not be provided herein.

Figure 2:
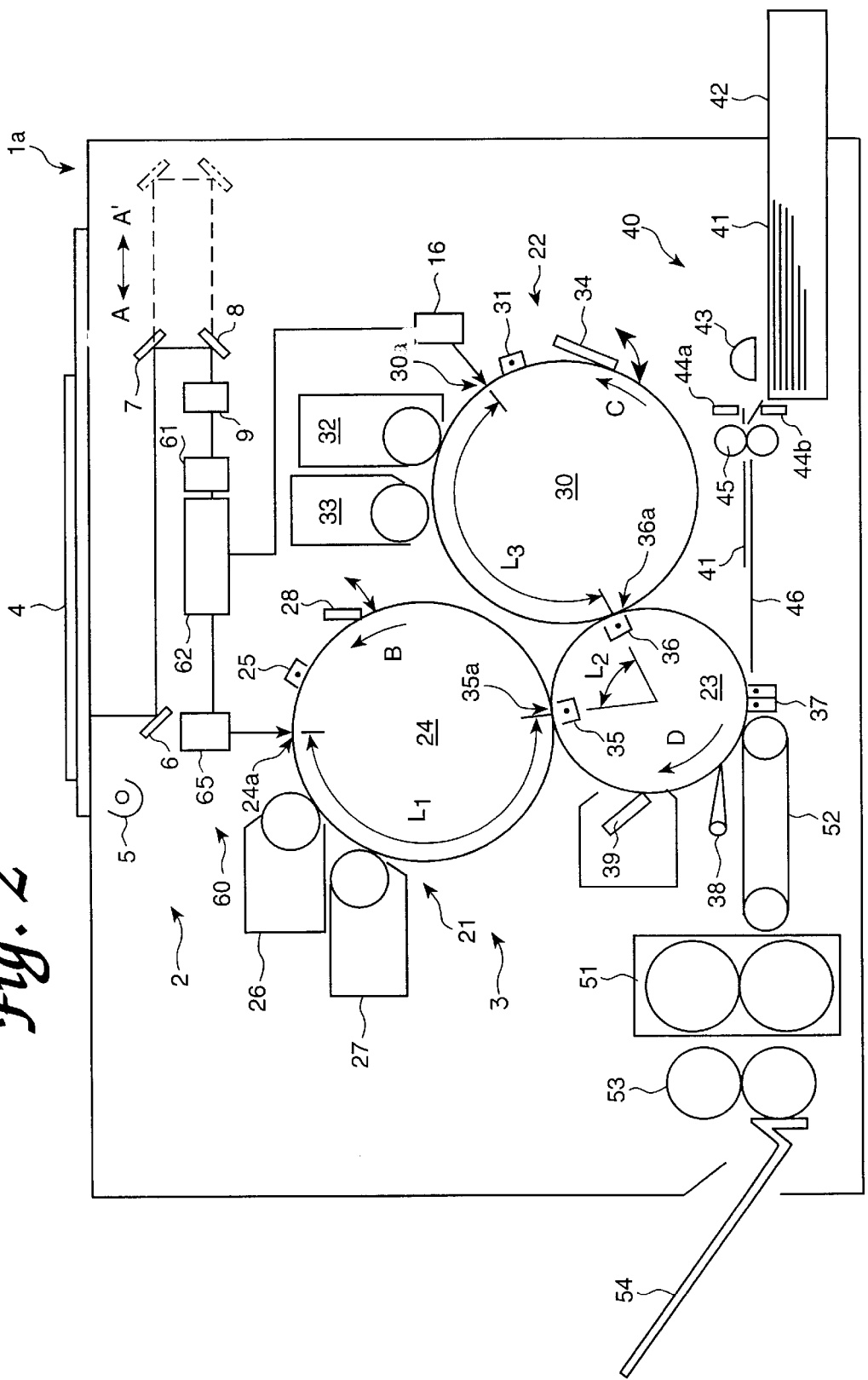
FIG. 2 is a schematic cross-sectional diagram of an image formation apparatus of Example 2 of the present invention.
Figure 3:
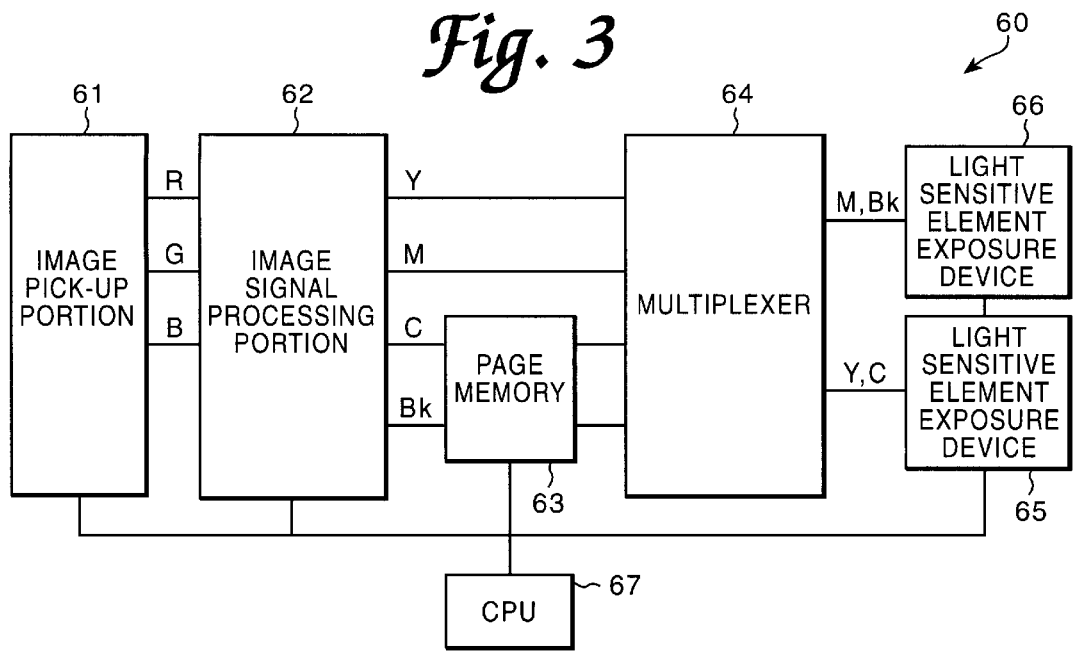
FIG. 3 is a block diagram of the configuration of an image treating portion of the image formation apparatus.

In an image formation apparatus 1a of Example 2, as shown in FIG. 2, an image portion 60 is provided in place of the half mirror 10, filters 14 to 17 at the light flux output side of the zoom lens 9.

As shown in Table 3, the image process portion 60 comprises an image pick-up portion 61, an image signal processing portion 62 (image signal generation means), a page memory 63 (first memory means), a multiplexed 64 (image signal selection means), light sensitive element exposure devices 65, 66 (first light sensitive element exposure means, second light sensitive element exposure means), and CPU (central processing unit) 67.

The image pick-up portion 61 comprises a CCD (charge coupled device) as a color photoelectric transfer element so that an original image is formed on the CCD. The CCD separates the received light image into red (R), green (G) and blue (B) as well as send out an image signal corresponding to each color to the image signal processing portion 62.

The image signal processing portion 62 has a function of processing an image digitally on the basis of the image signal sent from the image pick-up portion 61. More specifically, the image signal processing portion 62 convert the image signals corresponding to R, G, B sent out from the image pick-up portion 61 to the image signals corresponding to yellow as a first color, magenta as a second color, cyan as a third color, and black as a fourth color (abbreviated as Y, M, C, Kb in the drawings). Then the image signal processing portion 62 outputs the image signals corresponding to yellow (Y), magenta (M) directly to the multiplexed 64 at a predetermined timing as well as the image signals corresponding to cyan (C) and black (Kb) to the page memory 63.

The page memory 63 has a function of temporarily storing the image signals corresponding to cyan (C) and black (Kb), and outputs the image signals at a predetermined timing to the multiplexed 64 by the control of the CPU 67. The page memory 63 has a capacity capable of storing one page or more of the image signals, and thus exposure and scanning of the original needs to be done only once.

The multiplexed 64 has a function selectively guiding the image signals corresponding to yellow (Y) and cyan (C) to the light sensitive element exposure device 65 among the outputted image signals corresponding to yellow (Y), magenta (M), cyan (C) and black (Kb) as well as selectively guiding the image signals corresponding to magenta (M) and black (Kb) to the light sensitive element exposure device 66.

The light sensitive element exposure devices 65, 66 irradiate a laser beam to the light sensitive elements 24, 30 respectively on the basis of the image signals sent out via the multiplexed 64 so as to expose the light sensitive elements 24, 30. An LED (light emitting diode) can also be used as means for exposing the light sensitive elements 24, 30 in place of the light sensitive element exposure devices 65, 66.

At the time a first color image is formed on the light sensitive element 24 by the first process portion 21 later described as well as a second color image is formed on the light sensitive element 30 by the second process portion, the CPU 67 controls so that the image signals corresponding to a third color (cyan (C)) stored in the page memory 63 are sent out to the light sensitive element exposure device 65 as well as the image signals corresponding to a fourth color (black (Kb)) are sent out to the light sensitive element exposure device 66.

Since the configuration of the image formation portion 3 is almost the same as Example 1, only the different points will be explained below.

The first color image and the third color image are formed on the light sensitive element 24 on the basis of the exposure of the light sensitive element exposure device 65 and the second color image and the fourth color image are formed on the light sensitive element 30 on the basis of the exposure of the light sensitive element exposure device 66.

The first color can be developed in the developing device 26 either by the contact developing method for developing with the developing device 26 contacting to the light sensitive element 24 or by the non-contact developing method for developing with the developing device 26 not contacting to the light sensitive element 24. However, in the case of the non-contact developing method, a mechanism for separating and contacting the developing device 26 with the light sensitive element 24 and a mechanism such as a shutter for supplying a developer for the developing device 26 are required. On the other hand, the third color is developed in the developing device 27 by the non-contact developing method with the developing device 27 not contacting with the light sensitive element 24.

By having the non-contact developing method as the developing method at least in the developing device 27, since a complicated developing control at the time of non-developing (such as separating and contacting the developing device 27 and shutter control for a developer) is not required, the configuration of the device main body can be simplified to provide an inexpensive device as well as a high quality image formation can be conducted without color-mixing.

Further, in particular, by having the non-contact developing method as the developing method also in the developing device 26, since a separating and contacting mechanism of the developing device 26 can be omitted, the arrangement of the developing devices 26, 27 can be freer so that a wide range of applications of the user can be easily satisfied.

As to the developing method of a second color in the developing device 32, either of the non-contact developing method for developing with the developing device 32 contacting to the light sensitive element 30 or by the non-contact developing method for developing with the developing device 32 not contacting to the light sensitive element 30. However, in the case of the non-contact developing method, a mechanism for separating and contacting the developing device 32 with the light sensitive element 30 or a mechanism such as a shutter for supplying a developer for the developing device 32 is required. On the other hand, the fourth color is developed in the developing device 33 by the non-contact developing method with the developing device 33 not contacting with the light sensitive element 30.

By having the non-contact developing method as the developing method at least in the developing device 33, since a complicated developing control at the time of non-developing (such as separating and contacting the developing device 33 and shutter control for a developer) is not required, the configuration of the device main body can be simplified to provide an inexpensive device as well as a high quality image formation can be conducted without color-mixing.

Further, in particular, by having the non-contact developing method as the developing method also in the developing device 32, since a separating and contacting mechanism of the developing device 32 can be omitted, the arrangement of the developing devices 32, 33 can be freer so that a wide range of applications of the user can be easily satisfied.

In this embodiment, the constituents of the first process portion 21 and the second process portion 22 including the developing devices 26, 27, 32, 33 are removable and common to each other. Accordingly, since productivity of the constituents is improved, a large economical effect can be achieved.

Since the developing devices 26, 27, 32, 33 are removable, various image formation conditions of a user can be easily satisfied.

Since the developing devices 26, 27, 32, 33 are removable, developing devices for developing certain colors can be optionally selected and mounted. Accordingly, for example, in the case of two-color copying, by mounting a developing device for developing black in the second process portion 22 and mounting a developing device for developing a color most frequently used by a user in the first process portion 21, the two color copying frequently used can be done quickly by one rotation of the light sensitive elements 24, 30.

It is also possible to mount an optional developing device at an optional position. For example, a developing device having a developer of a color frequently used, such as black or red can be mounted at plural positions according to the application of a user. Accordingly, by mounting a developer frequently used such as black and red in plural developing devices, the number of changing developing devices can be reduced to enable the two-color development in a long time for one time filling of the developer in the case of conducting two color copying in a large amount.

As heretofore mentioned, an image formation apparatus 1 satisfying various users' requirements with a good operability and a high practicality can be provided. Since the productivity of the developing devices 26, 27, 32, 33 can be improved, by the image formation apparatus 1 of this embodiment, a large economical effect can be securely obtained.

The cleaning blades 28, 34 are removable with respect to the light sensitive elements 24, 30. More specifically, the cleaning blades 28, 34 are separated from the light sensitive elements 24, 30 when an image is formed at the light sensitive elements 24, 30. On the other hand, when the transfer to the intermediate transfer drum 23 is started and the rear edge of the image formed on the light sensitive elements 24, 30 passes through the cleaning blades 28, 34, they are contacted to the light sensitive elements 24, 30 at a predetermined timing.

A transfer unit 35 (first transfer means) and a transfer unit 36 (second transfer means) are arranged at positions facing the light sensitive elements 24, 30 in the intermediate transfer drum 23. Images on the light sensitive elements 24, 30 are transferred to the intermediate transfer drum 23 by the transfer units 35, 36 at the first transfer portion 35*a* and the second transfer portion 36*a*. The intermediate transfer drum 23 is rotatable in the direction shown by an arrow D. A transfer unit 37 is arranged adjacent to the intermediate transfer drum 23 so that an image transferred on the intermediate transfer drum 23 is transferred on a paper 41 by the transfer unit 37.

Figure 4:
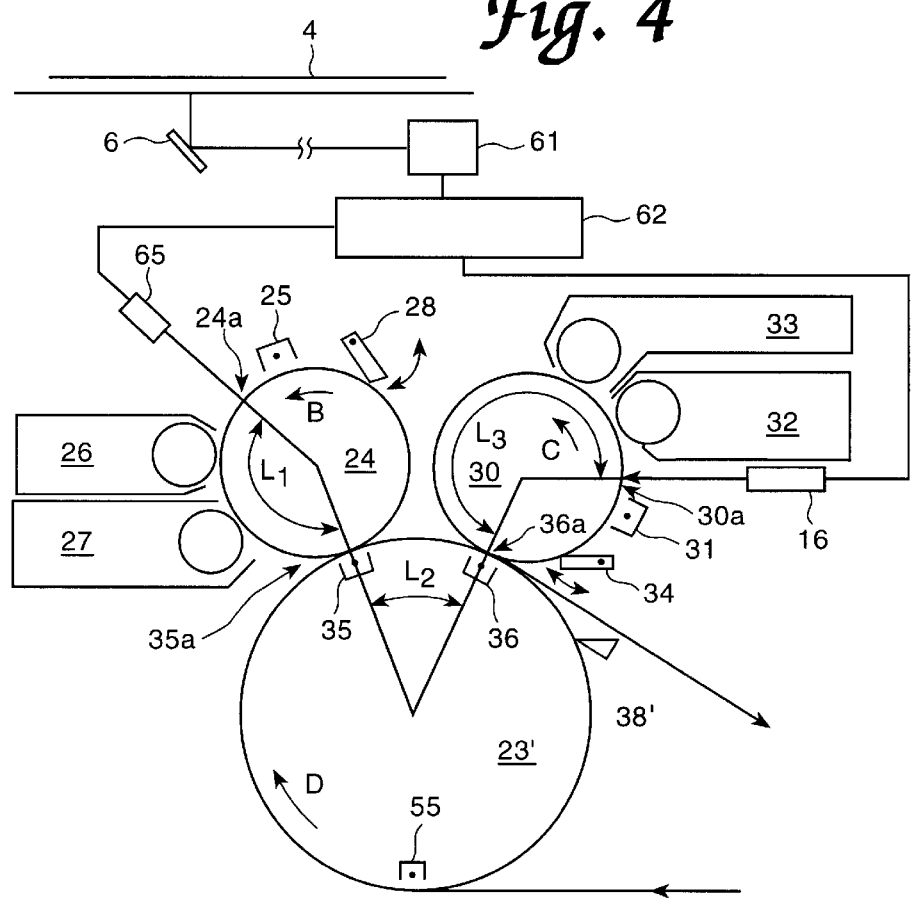
FIG. 4 is a cross-sectional view illustrating an embodiment of an image formation portion using a transfer drum.

In Example 2, as shown in FIG. 4, the first exposure portion 24a, the second exposure portion 30a, the first transfer portion 35a, and the second transfer portion 36a are positioned so that a distance from the first exposure portion 24a and the first transfer portion 35a on the first light sensitive element 24 surface $L_1$, a distance from the first transfer portion 35a and the second transfer portion 36a on the intermediate transfer drum 23 surface $L_2$, and a distance from the second exposure portion 30a and the second transfer portion 36a on the second light sensitive element 30 surface $L_3$ satisfy the relationship of $L_1+L_2=L_3$. Accordingly, in the case exposure of the light sensitive elements 24, 30 by the light sensitive element exposure devices 65, 66 are synchronized, an image transferred from the light sensitive element 24 to the intermediate transfer medium 23 and an image transferred from the light sensitive element 30 to the intermediate transfer medium 23 can be superimposed on the second transfer portion 36a.

A paper removing nail 38 for removing the paper 41 adhered to the intermediate drum 23 and a cleaning blade 39 for cleaning the intermediate transfer drum 23 after the transfer are arranged at the downstream side with respect to the rotation direction of the intermediate transfer drum 23 of the transfer unit 37in this order. The paper removing nail 38 is for forcibly removing the paper 41 in the case the paper 41 does not detach from the intermediate transfer drum 23 so as not to disturb an image formed on the intermediate transfer drum 23.

The image formation apparatus 1a main body comprises a control device (not illustrated) for controlling cleaning operation of the intermediate transfer drum 23 by the cleaning blade 39. Accordingly, the intermediate transfer drum 23 is not cleaned until a full color image formed on the intermediate transfer drum 23 is transferred on the paper 41.

Since the configuration of supply of the paper 41 to the image formation portion 3 and discharge of the paper 41 from the image formation portion 3 is the same as Example 1, further explanation is not provided herein.

Operation of the image formation apparatus 1 in the case of forming a full color image in the configuration will be described hereinafter.

After the exposure of the original 4 by the light source 5, the reflected light enters the image pick-up portion 61 of the image process portion 60 via the reflection mirrors 6, 7, 8 and the image formation lens 9. The reflected light entered the image pick-up portion 11 is transferred photoelectrically to image signals corresponding to R, G, B by the image pick-up portion 11 and sent out to the image signal processing portion 62.

The image signal processing portion 62 converts the image signals outputted from the image pick-up portion to image signals corresponding to yellow (Y), magenta (M), cyan (C) and black (Kb). Then the image signal processing portion 62 outputs the image signals corresponding to yellow (Y) to the light sensitive element exposure device 65 via the multiplexed 64 at a predetermined timing, the image signals corresponding to magenta (M) to the light sensitive element exposure device 66 via the multiplexed 64 as well as the image signals corresponding to cyan (C) and black (Kb) to the page memory 63.

In the first process portion 21, the light sensitive element 24 is uniformly charged by the charger 25. The light sensitive element exposure device 65 irradiates a laser beam to the first exposure portion 24a on the light sensitive element 24 surface on the basis of the image signals corresponding to yellow (Y) outputted from the image signal processing portion 62. Accordingly, a first electrostatic latent image corresponding to yellow (Y) is formed on the light sensitive element 24 surface. The first electrostatic latent image is developed by the developing device 26 to be visualized as the first color image.

On the other hand, in the second process portion 22, the light sensitive element 30 is uniformly charged by the charger 31. The light sensitive element exposure device 66 irradiates a laser beam to the second exposure portion 30a on the light sensitive element 30 surface on the basis of the image signals corresponding to magenta (M) outputted from the image signal processing portion 62. Accordingly, a second electrostatic latent image corresponding to magenta (M) is formed on the light sensitive element 30 surface. The second electrostatic latent image is developed by the developing device 32 to be visualized as the second color image.

After writing the light sensitive elements 24, 30 on the basis of the image signals corresponding to yellow (Y) and magenta (M), the image signals corresponding to cyan (C) temporarily stored in the page memory 63 are outputted to the light sensitive element exposure device 65 via the multiplexed 64 as well as the image signals corresponding to black (Kb) are outputted to the light sensitive element exposure device 65 via the multiplexed 65.

In the first process portion 21, the light sensitive element 24 including the formed first color image is uniformly charged by the charger 25 again. The light sensitive element exposure device 65 irradiates a laser beam to the first exposure portion 24a on the light sensitive element 24 surface on the basis of the image signals corresponding to cyan (C) outputted from the image signal processing portion 62. Accordingly, a third electrostatic latent image corresponding to cyan (C) superimposed on the first color image is formed on the light sensitive element 24 surface. The third electrostatic latent image is developed by the developing device 26 to be visualized as the third color image. That is, a first color image formed by superimposing the first color image and the third color image is formed on the light sensitive element 24 surface.

Similarly, in the second process portion 22, the light sensitive element 30 including the formed second color image is uniformly charged by the charger 31 again. The light sensitive element exposure device 66 irradiates a laser beam to the second exposure portion 30a on the light sensitive element 30 surface on the basis of the image signals corresponding to black (Kb) outputted from the image signal processing portion 62. Accordingly, a fourth electrostatic latent image corresponding to black (Kb) superimposed on the second color image is formed on the light sensitive element 30 surface. The fourth electrostatic latent image is developed by the developing device 33 to be visualized as the fourth color image. That is, a second color image formed by superimposing the second color image and the fourth color image is formed on the light sensitive element 30 surface.

The above order of the image formation in the light sensitive elements 24, 30 is just an example, and thus other orders can be employed as well.

The first color image formed on the light sensitive element 24 is transferred to the intermediate transfer drum 23 by the transfer unit 35 at the first transfer portion 35a. Then the second color image formed on the light sensitive element 30 is transferred to the intermediate transfer drum 23 by the transfer unit 36 at the second transfer portion 36a.

Since the relationship of $L_1+L_2=L_3$ is satisfied as mentioned above, the second color image is transferred so as to be superimposed on the first color image at the second transfer portion 36a. Accordingly, the four color images, or the full color image (final color image) is formed on the intermediate transfer drum 23.

The light sensitive element 24 after the transfer of the first color image to the intermediate transfer drum 23 is cleaned by the cleaning blade 28 and the charge is eliminated by a charge eliminating device (not illustrated) as needed so as to prepare f or the next image formation. The light sensitive element 30 after the transfer of the second color image to the intermediate transfer drum 23 is similarly cleaned by the cleaning blade 34 and the charge is eliminated by a charge eliminating device (not illustrated) as needed so as to prepare for the next image formation.

The four kinds of superimposed and transferred images on the intermediate transfer drum 23, that is, an unfixed full color image is conveyed to the vicinity of the transfer unit 37 according to the rotation of the intermediate transfer drum 23. Then the edge of the paper 41 supplied from the paper supply portion 40 later described is positioned to coincide with the edge of the image by the paper sensors 44a, 44b and the resist roller 45, and the image is transferred to the paper 41 by the transfer unit 37.

Accordingly, the paper 41 on which an unfixed full color image is transferred is conveyed to the fixing device 51 by the paper conveyance roller 52. The image is fixed on the paper 41 by the fixing device 51. Then the paper 41 is discharged to the paper discharge tray 54 by the paper discharge roller 53.

According to the configuration, unlike the conventional four drum type image formation apparatus, a full color image can be obtained by forming two color images with the two light sensitive elements 24, 30 without using four light sensitive elements. Accordingly, the device can be downsized by the reduction of the number of the light sensitive elements. Besides, since a full color image can be obtained by two rotations of the light sensitive elements 24, 30, the image formation apparatus 1 with an image formation speed faster than a conventional four rotation process type image formation apparatus can be obtained.

According to the configuration, by the reduction of the number of the light sensitive elements, the number of process elements provided adjacent to the light sensitive elements 24, 30, such as the chargers 25, 31 and the cleaning blades 28, 34 can be reduced as well. As a consequence, the cost of the device can be reduced and thus an economical image formation apparatus can also be obtained.

Besides, since the light sensitive elements 24, 30 are cleaned by the cleaning blades 28, 34 each time of the image transfer to the intermediate transfer drum 23, a full color image can be obtained without color-mixing.

Since the elements are arranged to satisfy the relationship of $L_1+L_2=L_3$ in the above configuration, in the case exposure of the light sensitive elements 24, 30 are synchronized, the first color image and the second color image can be superimposed automatically on the second transfer portion 36a. That is, misregistration of the first color image and the second color image will not occur on the intermediate transfer drum 23.

Accordingly, the quality of an obtained full color image can be improved. Besides, since means for controlling the both images on the second transfer portion is not required, the configuration of the device can be simplified.

According to the configuration, since predetermined image signals are temporarily stored at the page memory 63 provided at the image process portion 60, exposure and scanning of the original 4 needs to be done only once. Accordingly, an image formation apparatus 1 with a rapid image formation speed can be provided as well as a full color image can be obtained without misregistration of images.

Furthermore, in the case of Example 2, the storage capacity of the page memory 63 needs to be for two pages for storing the two color image information. On the other hand, in the case of a conventional four rotation process type image formation apparatus for storing the four color image information by one scanning, since the three color image information needs to be stored while conducting one color image formation, the storage capacity for three pages is required. Accordingly, the memory capacity smaller than the conventional image formation apparatus by one page can be provided.

A belt type intermediate transfer belt (not illustrated) can be used in place of the intermediate transfer drum 23. In this case, the transfer area can be wider than the case the intermediate transfer medium comprises a drum. Accordingly, an image can be transferred by maximally utilizing the transfer area of the paper 41 as well as the transfer efficiency can be optimized. Furthermore, since the transfer conditions for each color can be freely set without having an effect from the paper 41, the control can be simplified. Besides, if the intermediate transfer belt is arranged in the light sensitive elements arrangement direction, the height of the device can be lowered and the device can be downsized.

In addition to the intermediate transfer drum 23, a transfer drum 23' (transfer medium) for electrostatically adhering a paper (not illustrated) as shown in FIG. 4 can be used as well. In this case, a charging device 55 (adhering means) is provided inside the transfer drum 23' for charging the transfer drum 23' and adhering the conveyed paper onto the transfer drum 23' surface. A paper removing nail 38' for detaching the paper adhered on the transfer drum 23' surface is provided at the paper discharge side with respect to the transfer drum 23' surface.

In the configuration, the paper adhered to the transfer drum 23' is conveyed to the first transfer portion 35a and the second transfer portion 36a according to the rotation of the transfer drum 23' to the direction shown by the arrow D in the figure. The images formed on the light sensitive elements 24, 30 are directly transferred to the conveyed paper by the transfer units 35, 36. According to the configuration, the transfer efficiency can be improved compared with the two rotation transfer method where the images formed on the light sensitive elements 24, 30 are transferred on the transfer drum 23', and transferred again on the paper.

A device for moving back and forth for reverse rotating the transfer medium each time of one color transfer and returning to a predetermined distance (to the printing standard position), and reverse rotating the transfer medium again can be used as the transfer medium. Accordingly, in the case a transfer drum or a transfer belt is used as the transfer medium, the transfer conditions (driving mechanism and the accuracy thereof) of four colors can be the same, and thus the accuracy of superimposing the four colors can be improved.

Example 3 of the present invention will be explained with reference to FIGS. 2 and 5. The members having the same function as in Example 2 have the same numerals and further explanation will not be provided herein.

Figure 5:
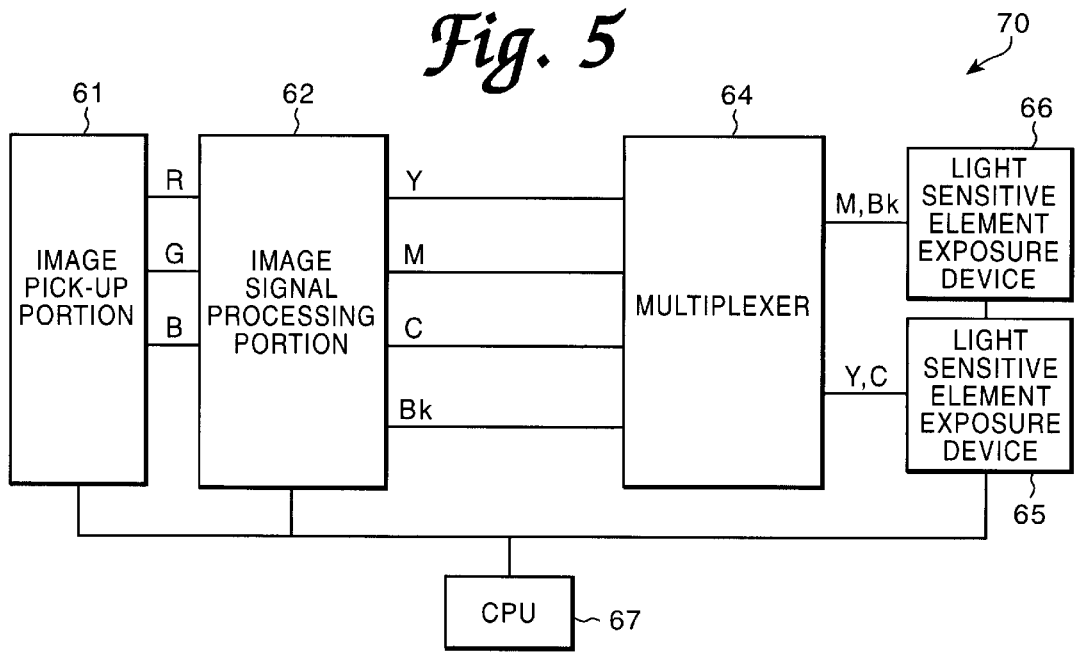
FIG. 5 is a block diagram of the configuration of an image treating portion of Example 3 of the present invention.

As shown in FIG. 5, the image process portion 10 of Example 3 has a configuration without the page memory 63 in the image process portion of FIG. 4. (see FIG. 3). At the time of the first original exposure, the image signals corresponding to yellow (Y) are selectively sent out to the light sensitive element exposure device 65 by the multiplexed 64 as well as the image signals corresponding to magenta (M) are selectively sent out to the light sensitive element exposure device 66. At the time of the second original exposure the image signals corresponding to cyan (C) are selectively sent out to the light sensitive element exposure device 65 as well as the image signals corresponding to black (Kb) are selectively sent out to the light sensitive, element exposure device 66. The configuration excluding the image process portion 70 is the same as that of Example 2.

As shown in FIG. 1, after the exposure of the original 4 by the light source 5, the image signal processing portion 62 outputs the image signals corresponding to yellow (Y), magenta (M), cyan (C), and black (Kb) to the multiplexed 64 on the basis of the electric signals from the image pick-up portion 61. The multiplexed 64 selects and passes only the image signals corresponding to yellow (Y) and magenta (M). That is, the multiplexed 64 sends the image signals corresponding to yellow (Y) to the light sensitive element exposure device 65 as well as sends the image signals corresponding to magenta (M) to the light sensitive element exposure device 66.

The light sensitive element exposure devices 65, 66 expose the light sensitive elements 24, 30 on the basis of the image signals. As a consequence, the first electrostatic latent image is formed on the surface of the light sensitive element 24 and the second electrostatic latent image is formed on the surface of the light sensitive element 30. The developing devices 26, 32 conduct development on the basis of the first and second electrostatic latent images so as to form the first color and second color visual images on the surf ace of the light sensitive elements 24, 30, respectively.

In this embodiment, the original 4 is exposed and scanned by the light source 5 again. Then the image signal processing portion 62 outputs the image signals corresponding to yellow (Y), magenta (M), cyan (C), and black (Kb) to the multiplexed 64 on the basis of the electric signals from the image pick-up portion 61 again. The multiplexed 64 selects and passes only the image signals corresponding to cyan (C) and black (Kb). That is, the multiplexed 64 sends the image signals corresponding to cyan (C) to the light sensitive element exposure device 65 as well as sends the image signals corresponding to black (Kb) to the light sensitive element exposure device 66.

The light sensitive element exposure devices 65, 66 expose the light sensitive elements 24, 30 on the basis of the image signals. As a consequence, the second electrostatic latent image is formed on the surface of the light sensitive element 24 and the fourth electrostatic latent image is formed on the surface of the light sensitive element 30. The developing devices 27, 33 conduct development on the basis of the second and fourth electrostatic latent images. Accordingly, the first color image comprising the superimposed first color image and third color image is formed on the light sensitive element 24 and the second color image comprising the superimposed second color image and fourth color image is formed on the light sensitive element 30.

As in the case of Example 2, the second color image is transferred to the intermediate transfer drum 23 at the second transfer portion 36a so as to be superimposed on the first color image transferred preliminarily on the intermediate transfer drum 23.

According to the configuration, since the exposure is conducted twice with respect to the original 4, memory means such as the page memory 63 for storing image signals necessary for the image formation at the second rotation of the light sensitive elements 24, 30 is not required. Therefore, according to the configuration, since an expensive page memory 63 is not required, the cost of the device can be reduced as well as the configuration of the device can be simplified.

Example 4 of the present invention will be explained with reference to FIGS. 2 and 6. The members having the same function as in Examples 2 and 3 have the same numerals and further explanation will not be provided herein.

Although the first exposure portion 24a, the second exposure portion 30a, the first transfer portion 35a, and the second transfer portion 36a are arranged so as to satisfy $L_1+L_2=L_3$. In this embodiment, the constituents are arranged so as to satisfy $L_1+L_2<L_3$. The configuration excluding the image process portion 80 is the same as that of Example 2.

Figure 6:
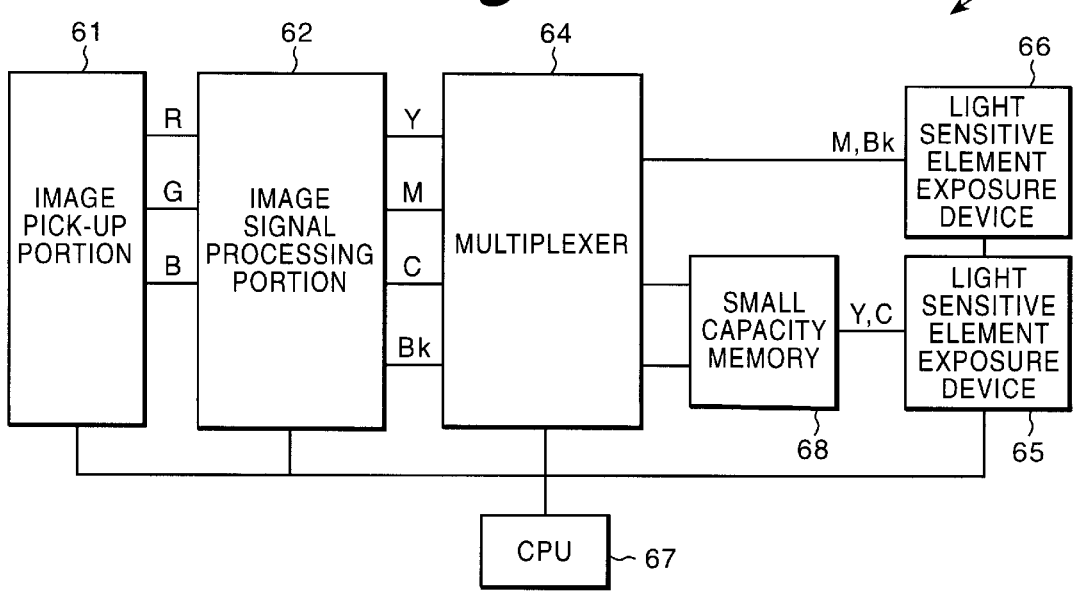
FIG. 6 is a block diagram of the configuration of an image treating portion of Example 4 of the present invention.

As shown in FIG. 6, the image process portion 80 of Example 4 comprises a small capacity memory 68 (second memory means) having a smaller memory capacity with respect to the page memory 63 used in Example 2 (see FIG. 2). The image signals corresponding to magenta (M) and black (Kb) outputted from the image signal processing portion 62 are directly sent to the light sensitive element exposure device 66 as well as the image signals corresponding to yellow (Y) and cyan (C) are sent to the small capacity memory 68 by the multiplexed 14. The image signals sent to the small capacity memory 68 are temporarily retained for the time corresponding to the distance difference of $(L_1+L_2)$ and $L_3$, and sent to the light sensitive element exposure device 65 at a predetermined timing by the control of the CPU 67.

The capacity of the small capacity memory 68 can be set according to the relationship of the positions of the process portion and the intermediate transfer medium. That is, the smaller the distance difference is, the smaller the capacity of the small capacity memory can be.

The image formation operation will be mainly explained hereinafter.

As shown in FIG. 1, after the exposure and scanning of the original 4 by the light source 5, the image signal processing portion 62 outputs the image signals corresponding to yellow (Y), magenta (M), cyan (C) and black (Kb) to the multiplexed 64 on the basis of the electric signals from the image pick-up portion 61. The multiplexed 64 selectively passes only the image signals corresponding to yellow (Y) and magenta (M). That is, the multiplexed 64 sends the image signals corresponding to yellow (Y) to the small capacity memory 68 and the image signals corresponding to magenta (M) to the light sensitive element exposure device 66.

At the time the small capacity memory 68 retains the image signals corresponding to yellow (Y) for the time corresponding to the distance difference $(L_1+L_2)$ and $L_3$, the CPU 67 sends the image signals from the small capacity memory 68 to the light sensitive element exposure device 65. Afterwards by the operation the same as Examples 2 and 3, the first color and second color images are formed on the surface of the light sensitive elements 24, 30.

The original 4 is exposed and scanned by the light source 5 again. Then the image signal processing portion 62 outputs the image signals corresponding to yellow (Y), magenta (M), cyan (C), and black (Kb) to the multiplexed 64 on the basis of the electric signals from the image pick-up portion 61 again. The multiplexed 64 selects and passes only the image signals corresponding to cyan (C) and black (Kb).

That is, the multiplexed 64 sends the image signals corresponding to cyan (C) to the small capacity memory 68 as well as sends the image signals corresponding to black (Kb) to the light sensitive element exposure device 66.

After the small capacity memory 68 retains the image signals corresponding to cyan (C) for the time corresponding to the distance difference ($L_1+L_2$) and $L_3$, the CPU 67 sends the image signals from the small capacity memory 68 to the light sensitive element exposure device 65. Then in the operation the same as Examples 1 and 2, the first color image comprising the superimposed first color image and third color image is formed on the light sensitive element 24 and the second color image comprising the superimposed second color image and fourth color image is formed on the light sensitive element 30. The second color image is transferred to the intermediate transfer drum 23 at the second transfer portion 36a so as to be superimposed on the first color image preliminarily transferred on the intermediate transfer drum 23.

According to the configuration, even in the case of ($L_1+L_2$)<$L_3$ due to the arrangement of the constituents of the first process portion 21 and the second process portion 22, and the intermediate transfer drum 23, by having the image formation in the first process portion 21 delayed by a predetermined time with respect to the image formation in the second process portion 22, the second color image transferred from the light sensitive element 30 to the intermediate transfer drum 23 at the second transfer portion 36a can be superimposed on the first color image preliminarily transferred on the intermediate transfer drum 23. Accordingly, even in the case of ($L_1+L_2$)<$L_3$, the quality of the obtained full color image can be improved.

Example 5 of the present invention will be explained with reference to FIG. 7. The members having the same function as in Examples 2 to 4 have the same numerals and further explanation will not be provided herein.

Figure 7:
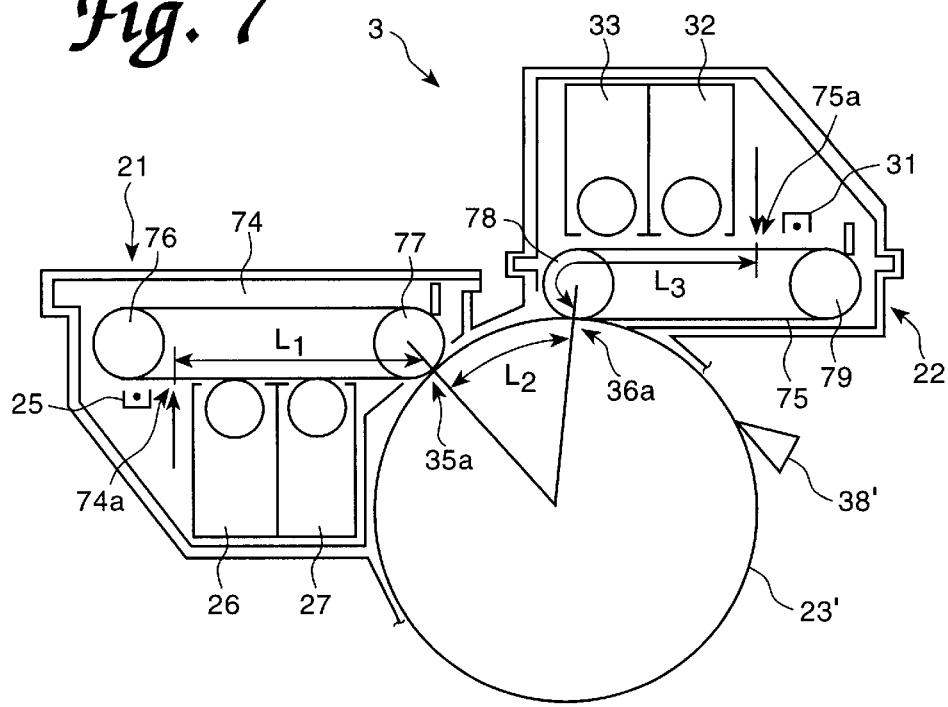
FIG. 7 is a cross-sectional view of an image formation portion using a light sensitive element belt of Example 5 of the present invention.

As shown in FIG. 7, the image formation portion 3 of Example 5 comprises the light sensitive element belts 74, 75 in place of the drum type light sensitive elements 24, 30 used in Examples 2 to 4. The light sensitive element belt 74 is horizontally arranged thinly by two tensioning rollers 76, 77. The light sensitive element belt 75 is also horizontally arranged thinly by two tensioning rollers 78, 79. The image formation operation in Example 5 is the same as that of Examples 2 to 4.

Accordingly, the height can be lowered compared with the case the light sensitive element comprises a drum. Accordingly, by horizontally arranging the light sensitive element belts 74, 75, the height of the device can be lowered to achieve downsizing of the device.

Furthermore, by arranging the light sensitive element belts 74, 75 vertically, even though the height of the device is slightly increased, the area occupied by the device is reduced. Therefore in this case, a device with a small installation area can be provided. Accordingly, by the direction of the light sensitive element belts 74, 75, various types of devices can be provided.

In Example 5, the first process portion 21 and the second process portion 22 are arranged opposite with respect to the transfer drum 23'. Accordingly, the image formation portion 3 can be compact so that the capacity of the image formation portion 3 can be minimized to achieve the downsizing of the device.

Any of the image process portions 60, 70, 80 (see FIGS. 2, 4, 5) explained in Examples 2 to 4 can be employed in Example 5. As long as the relationship $L_1+L_2=L_3$ is satisfied with a distance from the first exposure portion 74a and the first transfer portion 35a on the light sensitive element belt 74 surface $L_1$, a distance from the first transfer portion 35a and the second transfer portion 36a on the transfer drum 23' surface $L_2$, and a distance from the second exposure portion 75a and the second transfer portion 36a on the light sensitive element belt 75 surface $L_3$, the image process portion 60, 70 used in Examples 2 and 3 can be used.

On the other hand, if the relationship of $L_1$, $L_2$, $L_3$ is ($L_1+L_2$)<$L_3$ due to the arrangement of the constituents of the first process portion 21 and the second process portion 22, and the intermediate transfer drum 23, the image process portion 80 used in Example 4 can be employed.

Figure 8:
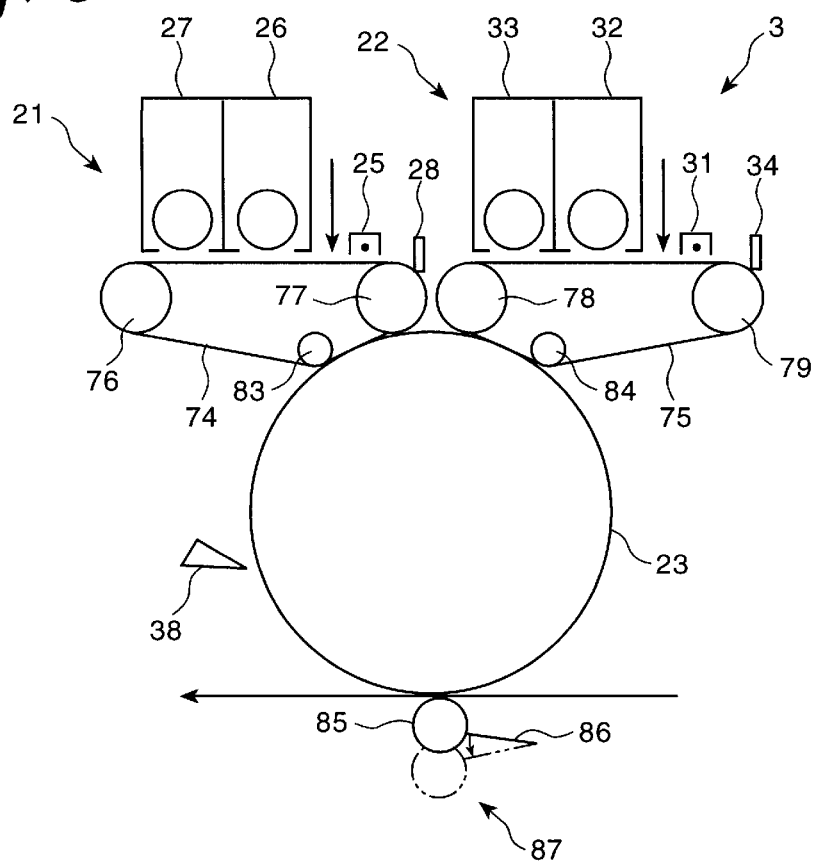
FIG. 8 is a cross-sectional view of the configuration of an image formation portion where the light sensitive element belt is arranged so as to enlarge the contact area with an intermediate transfer medium of Example 6 of the present invention.

Example 6 of the present invention will be explained with reference to FIG. 8. The members having the same function as in Examples 2 to 5 have the same numerals and further explanation will not be provided herein.

As shown in FIG. 7, in Example 6, a third tensioning roller 83 is provided for further tensioning the light sensitive element belt 74 horizontally tensioned by the tensioning rollers 76, 77 and a third tensioning roller 84 is provided for further tensioning the light sensitive element belt 75 horizontally tensioned by the tensioning rollers 78, 79 so as to enlarge the contact area of the light sensitive element belts 74, 75 and the intermediate transfer drum 23 used in Example 5. The image formation operation in Example 6 is the same as that of Examples 2 to 4.

Accordingly, the device can be downsized by lowering the height of the first process portion and the second process portion 22 as well as owing to the increase of the contact area of the light sensitive element belts 74, 75 and the intermediate transfer drum 23, the transfer efficiency from the light sensitive element belts 74, 75 to the intermediate transfer drum 23 can be improved.

Furthermore, since the light sensitive element belt 74 is tensioned by the three tensioning rollers 76, 77, 83 and the light sensitive element belt 75 is tensioned by the three tensioning rollers 78, 79, 84 in Example 6, a wide transfer area can be provided even if a diameter of the tensioning rollers 76, 77, 83, 78, 79, 84 is small. Accordingly, in this case, a further downsizing of the device can be achieved while maintaining a wide transfer area.

In Example 6, a transfer device 87 is provided in place of the transfer unit 37 (see FIG. 2) of Example 2.

The transfer device 87 comprises a transfer roller 85 for compressing a paper (not illustrated) from the rear side toward the intermediate transfer drum 23, a roller support portion 86 for supporting the transfer roller 85, a control portion (not illustrated) for controlling the movement of the transfer roller 85, and bias voltage application means (not illustrated) for applying a bias voltage for transferring an image formed on the intermediate transfer drum 23 to the paper.

According to the configuration, a full color image formed on the intermediate transfer drum 23 is conveyed to the transfer position to the paper according to the rotation of the intermediate transfer drum 23. At the time the control portion moves the transfer roller 85 at a predetermined timing so as to compress the paper to the intermediate transfer drum 23. By applying a bias voltage from the bias voltage application device, the full color image is transferred on the paper.

Accordingly, even in the case the transfer device 87 is used in place of the transfer unit 37 used in Example 2, an image formed on the intermediate transfer drum 23 can be securely transferred on a paper.

By providing the transfer device 87, the gap between the paper and the intermediate transfer drum 23 can be smaller, and thus the toner layer of four layers (yellow (Y), magenta (M), cyan (C), black (Kb)) can be efficiently transferred. Furthermore, since the transfer device uses a transfer method not using a charger, there is little ozone generation without little impact on the environment.

Example 7 of the present invention will be explained with reference to FIG. 9. The members having the same function as in Examples 2 to 6 have the same numerals and further explanation will not be provided herein.

Figure 9:
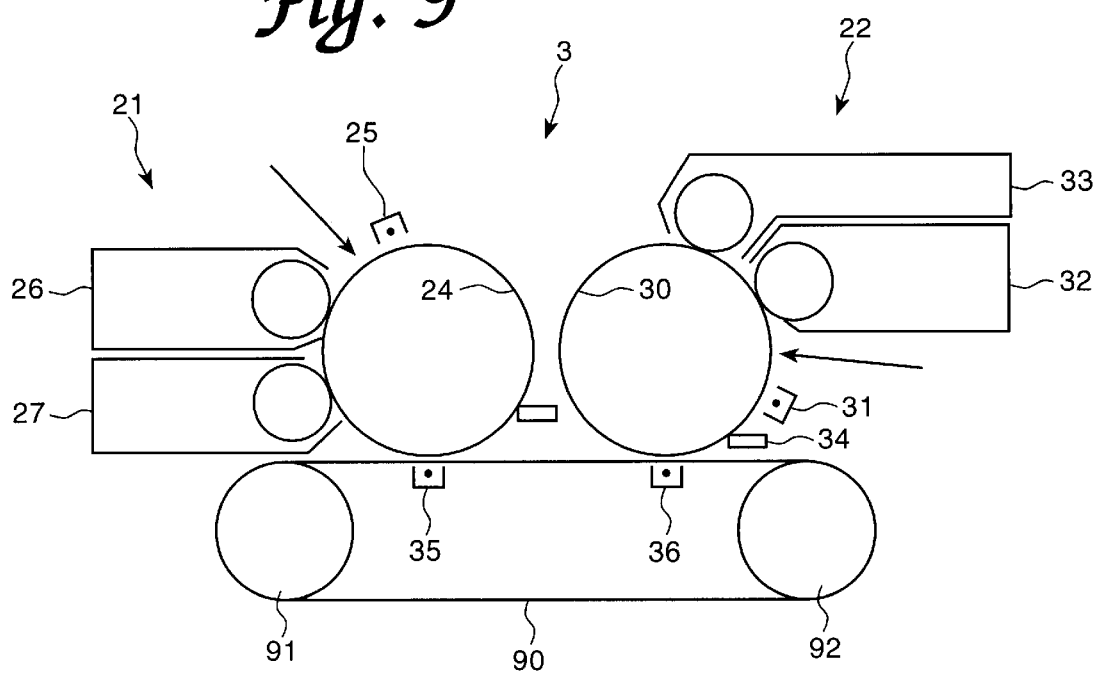
FIG. 9 is a cross-sectional view of an image formation portion using a transfer belt of Example 7 of the present invention.
Figure 10:
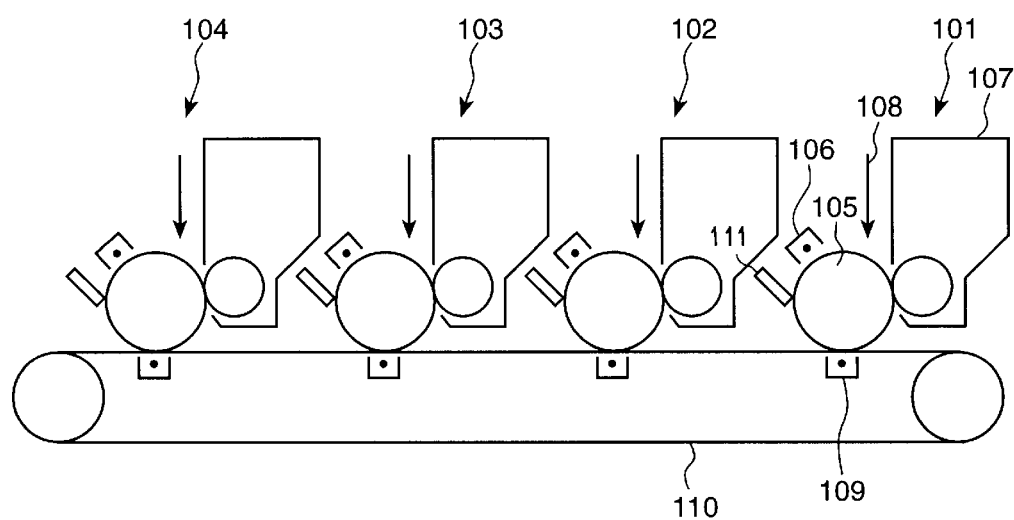
FIG. 10 is a cross-sectional view of the configuration of the main portion of a conventional image formation apparatus.

As shown in FIG. 9, the image formation portion 3 of Example 7 comprises a transfer belt 90. The transfer belt 90 is horizontally tensioned with the tensioning rollers 91, 92 contacting with the light sensitive elements 24, 30 at one side. The developing devices 26, 27, 32, 33 are arranged with the longitudinal direction along the tensioning direction of the transfer belt 90. The image formation operation in Example 7 is the same as that of Examples 2 to 6.

By arranging the transfer belt 90 tensioned in the horizontal direction, the height can be lowered compared with the case the transfer medium comprises a drum. Accordingly, by providing a transfer medium with a transfer belt 90, the height of the device can be lowered to achieve the downsizing of the device. Besides, since the developing devices 26, 27, 32, 33 are arranged as mentioned above in this embodiment, the height of the first process portion 21 and the second process portion 22 can be lowered as well, and thus further downsizing of the device can be achieved.

By providing a transfer medium with a transfer belt 90, the transfer area can be wider compared with the case the transfer medium comprises a drum. Accordingly, the transfer efficiency can be optimized as well as the image can be transferred maximally utilizing the transfer area of the paper.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An image formation apparatus for forming a multicolor image, comprising:

first and second light sensitive elements, first and second image exposure means for reading out an original image by exposure and exposing the original image on the first and second light sensitive elements, respectively, first image formation means for successively forming a first color image and a third color image on the first light sensitive element on the basis of the exposure of the first image exposure means, second image formation means for successively forming a second color image and a fourth color image on the second light sensitive element on the basis of the exposure of the second image exposure means, a transfer medium for transferring the first to fourth color images, arranged adjacent to the first and second light sensitive elements, first transfer means for transferring the image formed on the first light sensitive element, on the transfer medium, second transfer means for transferring the image formed on the second light sensitive element, on the transfer medium, and control means for superimposing the first to fourth color images successively formed on the first and second light sensitive elements, on each other, to transfer the first to fourth images to the transfer medium.

2. An image formation apparatus comprising:

an image reading device for reading out an original image, first and second light sensitive elements;

first and third developing devices for developing first and third, colors, respectively, on the first light sensitive element on the basis of image signals corresponding to the first and third colors from the image reading device;

second and fourth developing devices for developing second and fourth colors, respectively, on the second light sensitive element on the basis of image signals corresponding to the second and fourth colors from the image reading device;

a transfer medium having first and second transfer portions on a surface;

first transfer means for transferring the first color image developed by the first developing device at the first transfer portion and transferring the third color image developed by the third developing device on the transfer medium so as to be superimposed on the second color image conveyed to the first transfer portion; and second transfer means for transferring the second and fourth images developed by the second and fourth developing devices on the transfer medium so as to be superimposed on the first color image or the third color image conveyed to the second transfer portion, wherein the image reading device includes memory means for storing image signals corresponding to the third and fourth colors and control means for forming the third and fourth color images on the first and second light sensitive elements, respectively, on the basis of the image signals corresponding to the third and fourth colors stored in the memory means after the transfer of the first and second color images on the transfer medium.

3. The image formation apparatus of claim 1 or 2, wherein, assuming that a distance from a first exposure portion where the first light sensitive element is exposed, to the first transfer portion on the first light sensitive element surface is $L_1$, a distance from the first transfer portion to the second transfer portion on the transfer medium surface is $L_2$, and a distance from a second exposure portion where the second light sensitive element is exposed, to the second transfer portion on the second light sensitive element surface is $L_3$, the distances $L_1$, $L_2$ and $L_3$ satisfy a relationship of $L_1+L_2=L_3$.

4. The image formation apparatus of claim 1 or 2,, wherein the image reading means includes at least:

image signal generation means for generating image signals corresponding to the first to fourth colors on the basis of reflected light from the original, first light sensitive element exposure means for exposing the first light sensitive element on the basis of image signals corresponding to the first or third color, second light sensitive element exposure means for exposing the second light sensitive element on the basis of image signals corresponding to the second or fourth color, first memory means for temporarily storing image signals corresponding to the third and fourth colors among the image signals corresponding to the first to fourth colors generated by the image signal generation means, and control means for sending image signals corresponding to the fourth color, to the second light sensitive element exposure means as well as sending image signals corresponding to the third color stored in the first memory means, to the first light sensitive element exposure means, at the time a first color image is formed on the first light sensitive element by the first image formation means and a second color image is formed on the second light sensitive element by the second image formation means.

5. The image formation apparatus of claim 1 or 2, wherein the image reading means includes at least:

image signal generation means for generating image signals corresponding to the first to fourth colors on the basis of reflected light from the original, first light sensitive element exposure means for exposing the first light sensitive element on the basis of the image signals corresponding to the first or third color, second light sensitive element exposure means for exposing the second light sensitive element on the basis of the image signals corresponding to the second or fourth color, and image signal selection means for selectively sending the image signals corresponding to the second color, to the second light sensitive element exposure means as well as selectively sending the image signals corresponding to the first color, to the first light sensitive element exposure means, at the time of a first original exposure, and selectively sending the image signals corresponding to the fourth color, to the second light sensitive element exposure means, as well as selectively sending the image signals corresponding to the third color, to the first light sensitive element exposure means, at the time of a second original exposure.

6. The image formation apparatus of claim 1 or 2, wherein the image reading means comprises at least:

image signal generation means for generating the image signals corresponding to the first to fourth colors on the basis of reflected light from the original, first light sensitive element exposure means for exposing the first light sensitive element on the basis of the image signals corresponding to the first color or the third color, second light sensitive element exposure means for exposing the second light sensitive element on the basis of the image signals corresponding to the second color or the fourth color, second memory means for temporarily storing the image signals corresponding to the first color and the third color among the image signals corresponding to the first to fourth colors generated by the image signal generation means, and control means for sending the image signals corresponding to the first or third colors stored in the second memory means, to the first light sensitive element exposure means when a time corresponding to a distance difference between $(L_1+L_2)$ and $L_3$ wherein $L_1$ denotes a distance between a first exposure portion which is an exposure position on the first light sensitive element surface and a first transfer portion which is a contact portion of the first light sensitive element and an intermediate transfer medium on the first light sensitive element surface, $L_2$ denotes a distance between the first transfer portion and a second transfer portion which is a contact portion between the second light sensitive element and the intermediate transfer medium on the intermediate transfer medium surface, and $L_3$ denotes a distance between a second exposure portion which is an exposure position on the second light sensitive element surface and the second transfer portion on the second light sensitive element surface.

7. The image formation apparatus of claim 1 or 2, wherein the first image formation means includes:

a first developing device for developing the first color, a third developing device for developing the third color, first charging means for charging the first light sensitive element, and first cleaning means for cleaning the first light sensitive element, and the second image formation means includes:

a second developing device for developing the second color, a fourth developing device for developing the fourth color, second charging means for charging the second light sensitive element, and second cleaning means for cleaning the second light sensitive element, and the first image formation means and the second image formation means have a common configuration of constituents and a common arrangement.

8. The image formation apparatus of claim 7, wherein the first to fourth developing units are removable and arranged to be interchangeable to each other.

9. The image formation apparatus of claim 7, wherein developing methods of at least the third and fourth developing devices are non-contact developing methods for developing without contacting with the first and second light sensitive elements, respectively.

10. The image formation apparatus of claim 7, wherein developing methods of the first to fourth developing devices are non-contact developing methods for developing without contacting with the first and second light sensitive elements.

11. The image formation apparatus of claim 1 or 2, wherein the intermediate transfer medium is a belt-type intermediate transfer belt.

12. The image formation apparatus of claim 1 or 2, wherein the first and second light sensitive elements are composed of first and second light sensitive element belts, respectively.

13. The image formation apparatus of claim 12, wherein the first and second light sensitive element belts are arranged so that areas contacting with the intermediate transfer medium are increased.

14. An image formation apparatus for forming a multicolor image, comprising:

first and second light sensitive elements;

image reading means for reading an original image and exposing the first and second light sensitive elements on the basis of a readout original image;

first image formation means for successively forming first and third color images on the first light sensitive element on the basis of exposure of the image reading means;

second image formation means for successively forming second and fourth color images on the second light sensitive element on the basis of exposure of the image reading means;

a transfer medium for transferring the first to fourth color images directly on a transfer material by direct contact of the first to fourth color images with the transfer material;

adhering means for adhering the transfer material to the transfer medium;

first transfer means for transferring the image formed on the first light sensitive element, to the transfer material;

second transfer means for transferring the image formed on the second light sensitive element, to the transfer material; and control means for transferring the first to fourth color images successively formed on the first and second light sensitive elements to the transfer material so as to be superimposed to each other.

15. The image formation apparatus of claim 14, wherein the transfer medium is a belt-type transfer belt.

16. An image formation method comprising the steps of:

exposing and scanning an original to form a first color image on a first light sensitive element and form a second color image on a second light sensitive element;

transferring the first color image on a transfer medium and transferring the second color image on the transfer medium so as to be superimposed on the first color image;

exposing and scanning the original again to form a third color image on the first light sensitive element and form a fourth color image on the second light sensitive element; and transferring the third color image on the transfer medium so as to be superimposed on the second color image and transferring the fourth color image on the transfer medium so as to be superimposed on the third color image.

17. An image formation method comprising the steps of:

exposing and scanning an original to store image signals corresponding to a third color and a fourth color;

forming a first color image on a first light sensitive element on the basis of image signals corresponding to the first color and forming a second color image on a second light sensitive element on the basis of image signals corresponding to the second color;

transferring the first color image and the second color image on the transfer medium so that the images are superimposed to each other;

forming a third color image on the first light sensitive element on the basis of the stored image signals corresponding to the third color and forming a fourth color image on the second light sensitive element on the basis of the stored image signals corresponding to the fourth color;

transferring the third color image on the transfer medium so as to be superimposed on the second color image; and transferring the fourth color image on the transfer medium so as to be superimposed on the third color image.

18. An image formation method comprising the steps of:

exposing and scanning an original to form a first color image on a first light sensitive element on the basis of image signals corresponding to the first color as well as to form a second color image on a second light sensitive element on the basis of image signals corresponding to the second color;

transferring the first color image and the second color image on a transfer so that the images are superimposed to each other;

exposing and scanning the original again to form a third color image on the first light sensitive element on the basis of image signals corresponding to the third color as well as to form a fourth color image on the second light sensitive element on the basis of image signals corresponding to the fourth color;

transferring the third color image on the transfer medium so as to be superimposed on the second color image; and transferring the fourth color image on the transfer medium so as to be superimposed on the third color image.

19. The image formation apparatus of claim 8, wherein developing methods of at least the third and fourth developing devices are non-contact developing methods for developing without contacting with the first and second light sensitive elements, respectively.

20. The image formation apparatus of claim 8, wherein developing methods of the first to fourth developing devices are non-contact developing methods for developing without contacting with the first and second light sensitive elements.

* * * * *